United States Patent [19]

Ogawa et al.

[11] Patent Number: 5,253,234
[45] Date of Patent: Oct. 12, 1993

[54] DISK STORAGE/SELECT PLAYER

[75] Inventors: Masaya Ogawa; Norihiko Shibano; Norio Kawagishi, all of Saitama, Japan

[73] Assignee: Pioneer Electronic Corporation, Tokyo, Japan

[21] Appl. No.: 839,720

[22] Filed: Feb. 24, 1992

Related U.S. Application Data

[63] Continuation of Ser. No. 545,217, Jun. 28, 1990, abandoned.

[30] Foreign Application Priority Data

Sep. 11, 1989 [JP] Japan .................. 1-234948

[51] Int. Cl.[5] ............................................ G11B 17/22
[52] U.S. Cl. ......................... 369/36; 369/30; 369/33; 369/178
[58] Field of Search ............... 369/30, 33, 34, 35, 369/36, 37, 38, 39, 178, 179; 360/92

[56] References Cited

U.S. PATENT DOCUMENTS

| | | | |
|---|---|---|---|
| 2,612,710 | 10/1952 | Fuller ................................ | 369/34 |
| 3,043,597 | 7/1962 | Rockola ............................ | 369/37 |
| 3,129,005 | 4/1964 | Rockola ............................ | 369/37 |
| 3,183,005 | 5/1965 | Rockola ............................ | 369/37 |
| 4,260,162 | 4/1981 | Morii et al. ..................... | 369/215 |
| 4,647,989 | 3/1987 | Geddes ............................ | 369/34 |
| 4,667,802 | 5/1987 | Verduin et al. ................. | 369/34 |
| 4,855,979 | 8/1989 | Kimura et al. .................. | 369/33 |
| 5,031,346 | 6/1991 | Herring et al. ................. | 369/34 |
| 5,033,038 | 7/1991 | Kobayashi et al. ............. | 369/36 |
| 5,034,935 | 7/1991 | Ishibashi et al. ............... | 369/34 |

FOREIGN PATENT DOCUMENTS

| | | |
|---|---|---|
| 2736866 | 3/1979 | Fed. Rep. of Germany . |
| 3512933 | 10/1986 | Fed. Rep. of Germany . |
| 8715485 | 5/1988 | Fed. Rep. of Germany . |
| 1448329 | 6/1966 | France . |
| 2188893 | 1/1974 | France . |
| 61-261853 | 11/1986 | Japan . |
| 2162675 | 2/1986 | United Kingdom . |

*Primary Examiner*—Eugene R. LaRoche
*Assistant Examiner*—Tan Nguyen
*Attorney, Agent, or Firm*—Sughrue, Mion, Zinn, Macpeak & Seas

[57] ABSTRACT

A disk storage/select player includes several disks and several menu boards for indexing data items contained on the disks. The menu boards are each shaped like a polyhedral column. A driver turns one of the menu boards, and a synchronous rotation transfer element transfer the rotation of the one menu board to the remaining menu boards so that all of the menu boards rotate in synchronism.

18 Claims, 23 Drawing Sheets

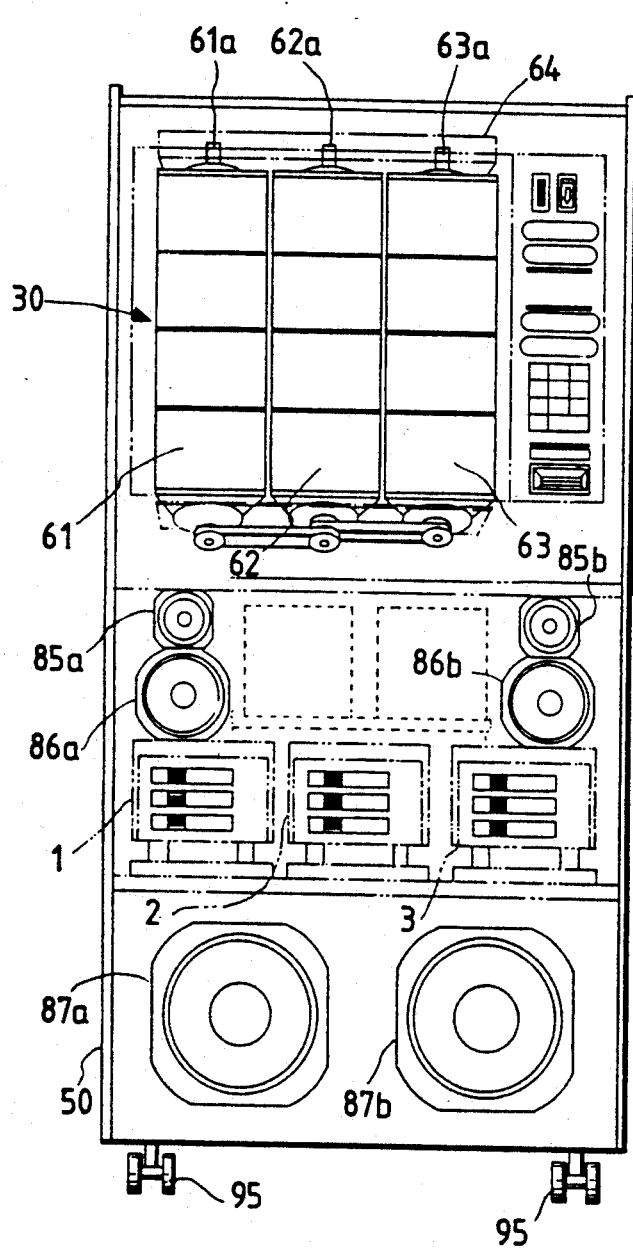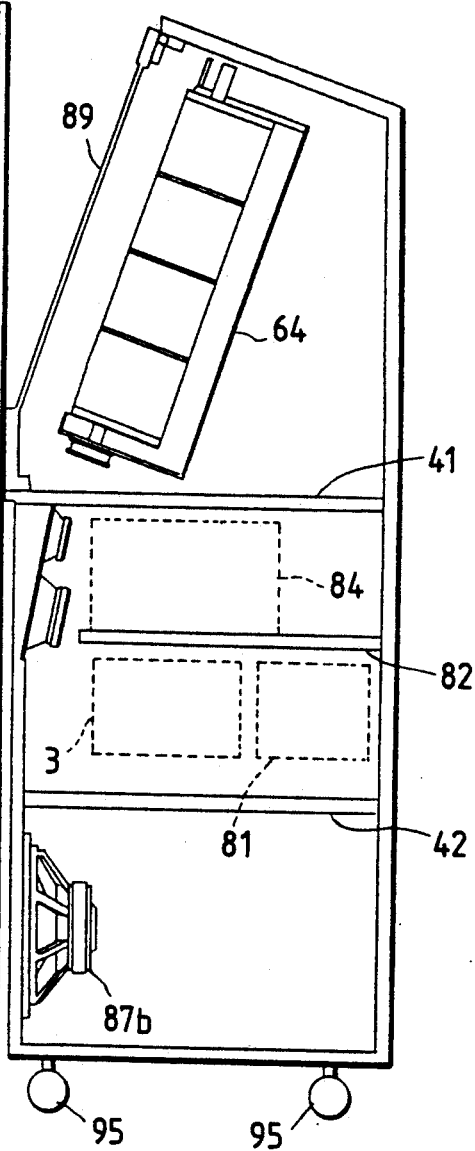

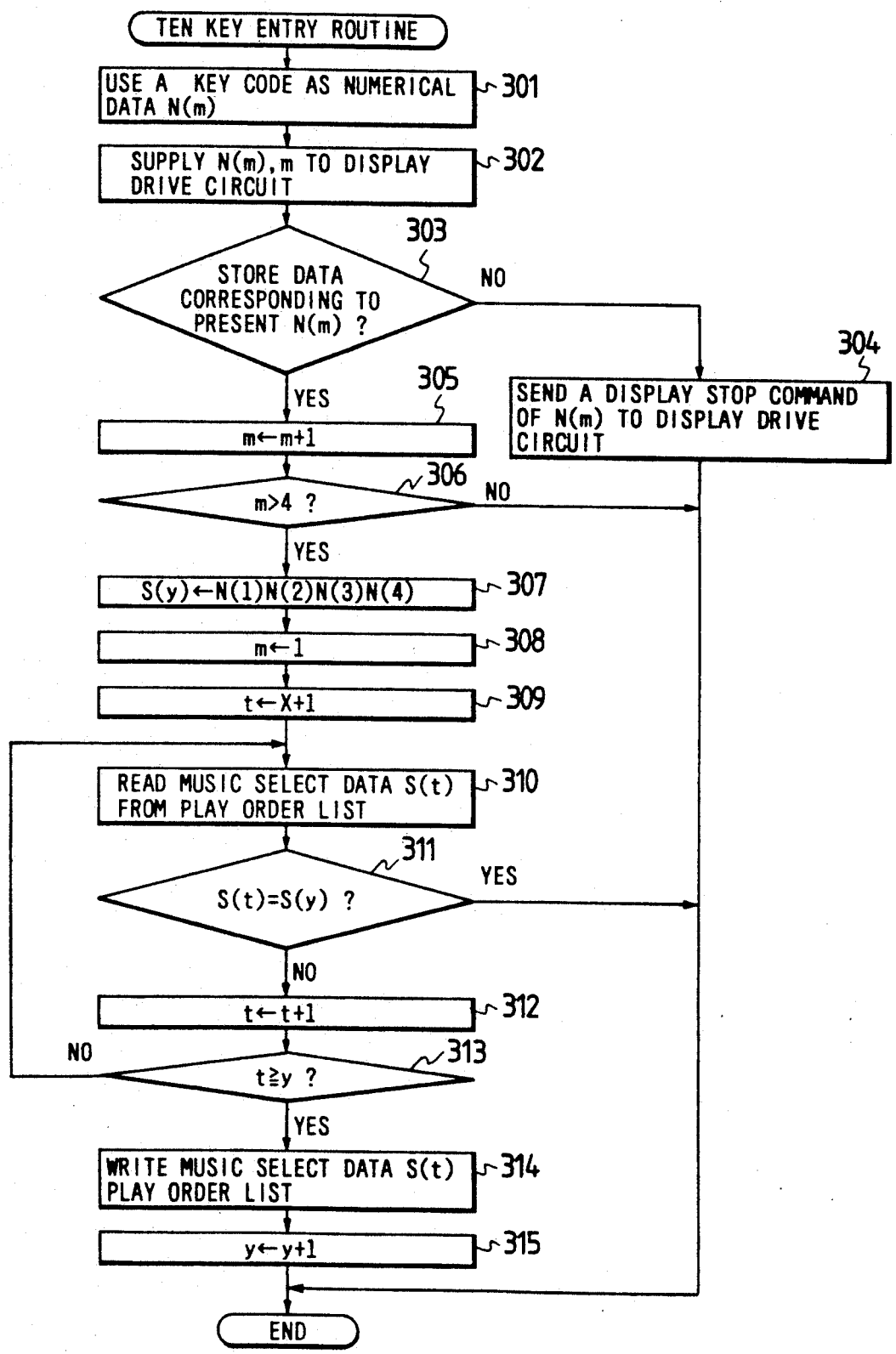

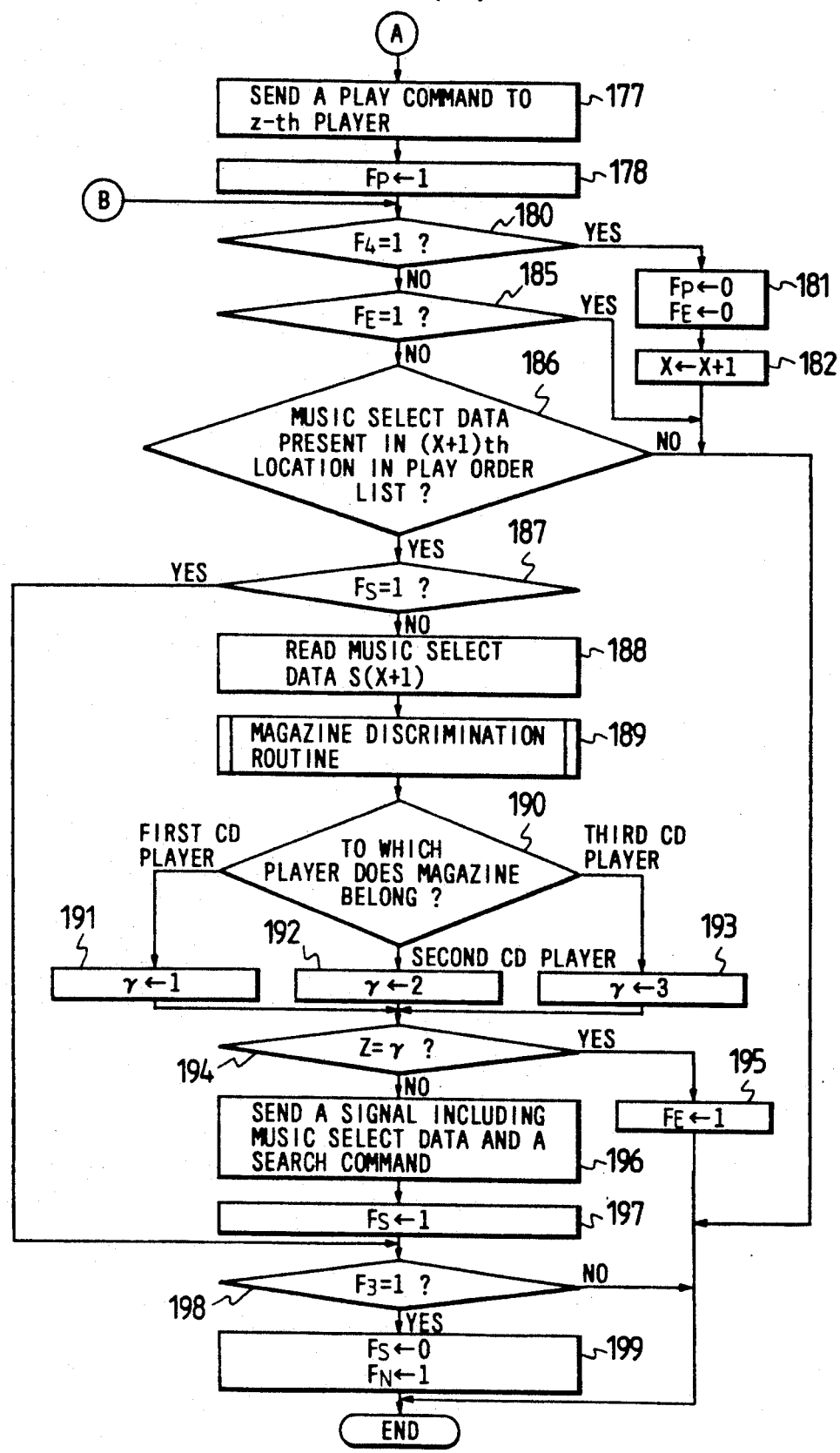

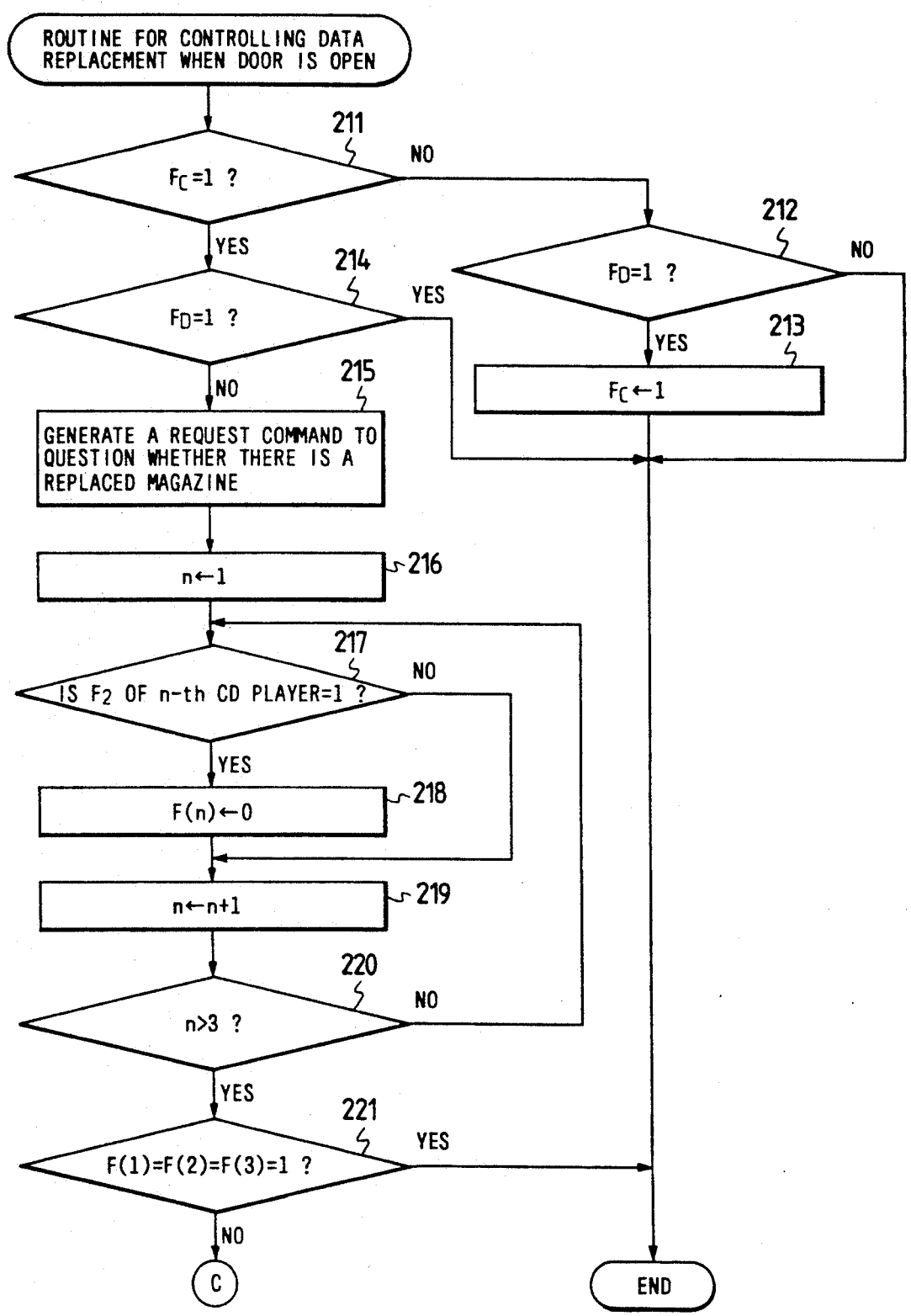

FIG. 14

| PLAYER | MAGAZINE | TOC DATA |
|---|---|---|
| 1 | 1 | TOC(1) |
| | | TOC(2) |
| | | TOC(3) |
| | | TOC(4) |
| | | TOC(5) |
| | | TOC(6) |
| | 2 | TOC(1) |
| | | TOC(2) |
| | | TOC(3) |
| | | TOC(4) |
| | | TOC(15) |
| | | TOC(16) |
| | 3 | TOC(1) |
| | | TOC(2) |

FIG. 15

| ORDER | MUSIC SELECT DATA |
|---|---|
| 1 | S(1) |
| 2 | S(2) |
| 3 | S(3) |
| 4 | S(4) |

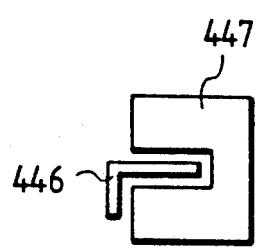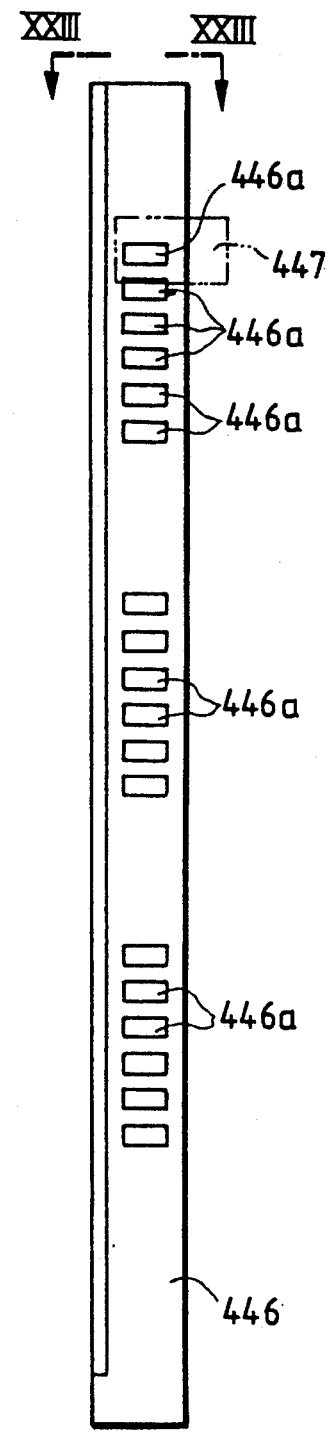

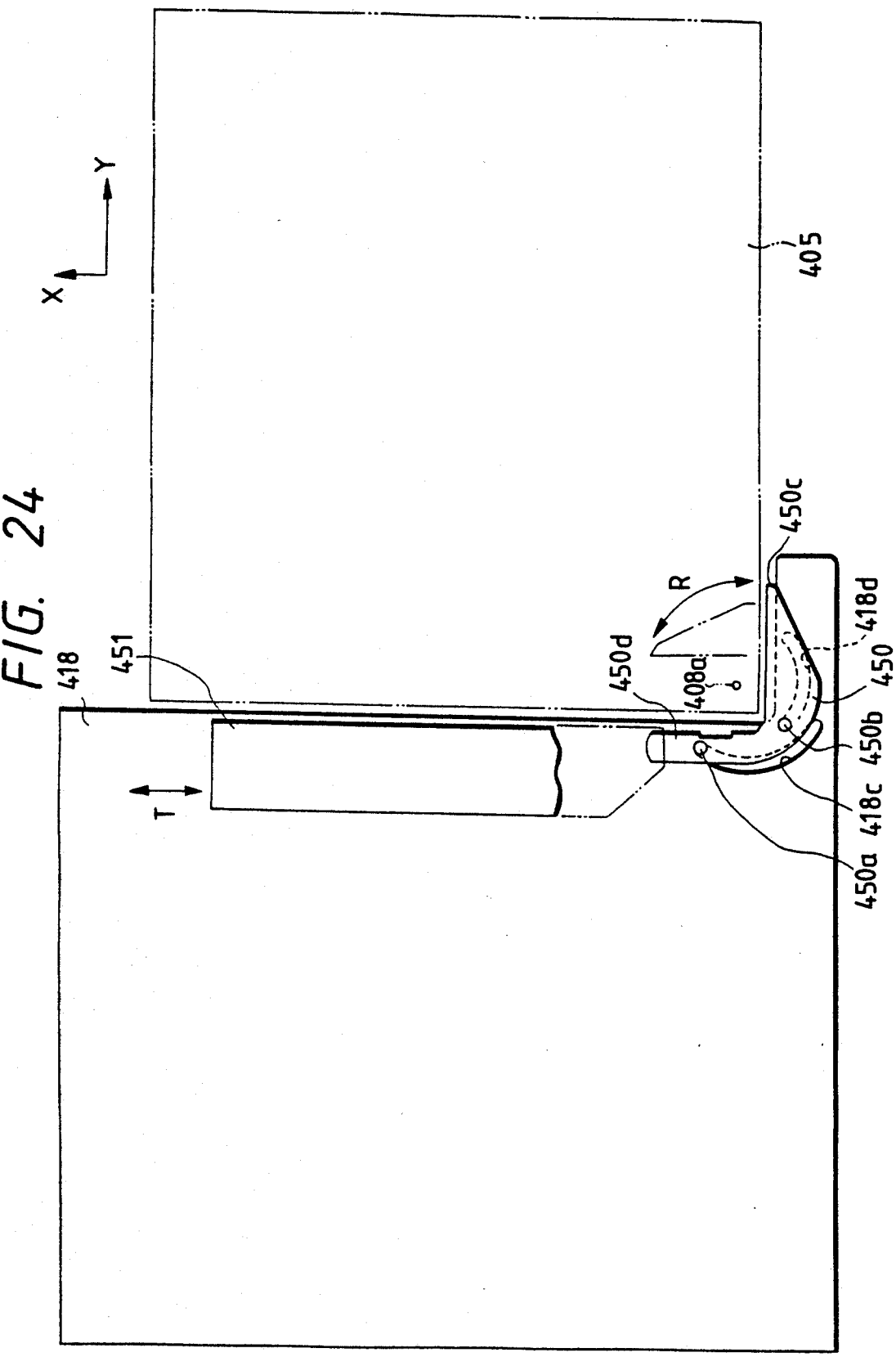

DISK STORAGE/SELECT PLAYER

This is a continuation of application Ser. No. 07/545,217 filed Jun. 28, 1990, now abandoned.

FIELD OF THE INVENTION

The present invention relates to a disk storage/select player, such as a jukebox.

BACKGROUND OF THE INVENTION

In a disk storage/select player, selectable musical or other data pieces are listed on a menu board. In operation, an operator selects a desired musical piece from among the listed musical pieces on the menu board, and then pushes one or more buttons corresponding to the selected piece. The buttons initiate a playback operation of the selected piece. In this type of automatic player, it is desirable to have as many musical pieces as possible listed on the menu board. When increasing the number of selectable musical pieces, it is necessary to increase the number of disks contained in the player. However, an increase in the number of disks contained in the player causes only a small increase in the size of the player. Further, an increase in the number of selectable musical pieces requires an increase in the area of the menu board where the musical pieces are listed. The increased area of the menu board, on the other hand, causes a considerable increase in the player size. It is desirable to limit the size of the player since a large player places constraints on its location.

OBJECT OF THE INVENTION

Accordingly, an object of the present invention is to provide a disk storage/select player in which the number of selectable musical pieces can be increased without substantially increasing the overall size of the disk storage/select player.

SUMMARY OF THE INVENTION

To achieve the above object, there is provided a disk storage/select player comprising a plurality of menu boards each shaped like a polyhedral column, and each side of the menu boards presenting selectable musical information. The player further comprises drive means for turning one of the plurality of menu boards; and synchronous rotation transfer means for transferring the rotation of the one menu board to the remaining menu boards so that all of the menu boards rotate in synchronism.

BRIEF DESCRIPTION OF THE DRAWINGS

FIG. 3(a) is a front view showing the player uncovered;

FIG. 3(b) is a side view showing the player uncovered.

FIGS. 8 through 13 are flowcharts of different control operations in the player of FIG. 1;

FIG. 14 is a diagram showing a TOC map;

FIG. 15 is a diagram showing a play-order list;

FIG. 22 is a diagram taken on line XXII—XXII in FIG. 18;

FIG. 23 is a diagram taken on line XXIII—XXIII in FIG. 22; and

FIG. 24 is a diagram taken on line XXIV—XXIV in FIG. 18.

DESCRIPTION OF THE PREFERRED EMBODIMENTS

An embodiment of the present invention will be described in detail with reference to the accompanying drawings.

Figure 1:
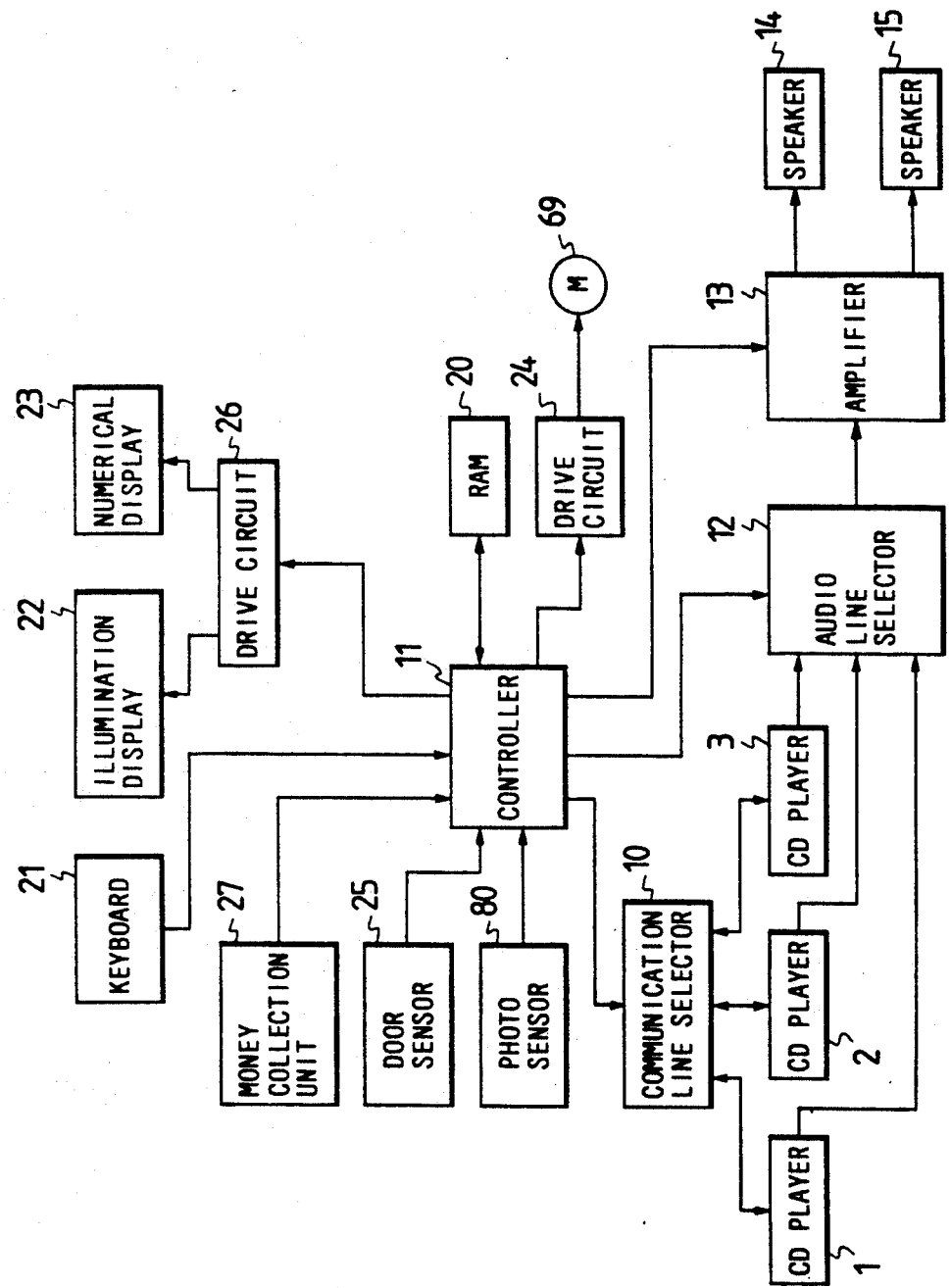
FIG. 1 is a block diagram showing an embodiment of the present invention.

FIG. 1 shows a block diagram of a disk storage/select player (e.g. jukebox) according to the present invention. In this jukebox, three CD (compact disk) players 1-3, of the magazine type, are installed. According to this embodiment, a maximum of three magazines, each capable of containing six disks vertically arrayed, can be set in each disk player. For details of a magazine type disk player, reference is made to Japanese Patent Unexamined Publication No. 61-261853. For a disk player in which three magazines can be loaded (disclosed in a copending application Ser. No. 07/503,644 of the present patent application), a pick-up and a turn table are vertically movable a distance equal to the three magazines. In FIG. 1, the disk players 1-3 are all installed, but in practice, only player 2 needs to be installed, the remaining players 1 and 3 being optionally installed.

Each of the players 1-3 is provided with a control terminal and an audio output terminal. The control terminal is connected through a communication line selector 10 to a controller 11. The players 1-3 are individually controlled by the controller 11. The audio output terminal is connected through an audio line selector 12 to an amplifier 13. The amplifier 13 receives the audio signals of the right and left channels supplied from the audio line selector 12, and amplifies them, and the amplified audio signals drive right and left speakers 14 and 15. The select operations of the communication line selector 10 and the audio line selector 12 are controlled by the controller 11.

The controller 11 which may be, for example, a microcomputer, operates in accordance with a program stored in a ROM (not shown) contained in the controller. The controller 11 is coupled with a RAM 20. The contents of RAM 20 are "backed-up" to protect against erasure when a power supply is stopped or interrupted. Data relating to the disks set in the CD players 1-3 are stored in RAM 20. The controller 11 is further connected to a keyboard 21, a drive circuit 26 for an illumination display 22 and a numeral display 23, a drive circuit 24 for a motor 69 to be described later, a door sensor 25 and a money collection unit 27.

The controller 11 is connected to the CD players 1–3 by four communication lines, through the communication line selector 10. Those four communication lines are: a ground line, a signal line from the controller 11 to the players 1–3, another signal line from the players 1–3 to the controller 11, and a confirmation line for confirmation of the loading of the players 1–3. When the power supply is turned on, each of the players 1–3 produces a predetermined confirmation voltage, e.g., 5 V, at the control terminal connecting to the confirmation line. Accordingly, if the controller 11 detects no confirmation voltage supplied through the confirmation line selected by the communication line selector 10, it decides that the corresponding CD player is not installed.

Figure 2:
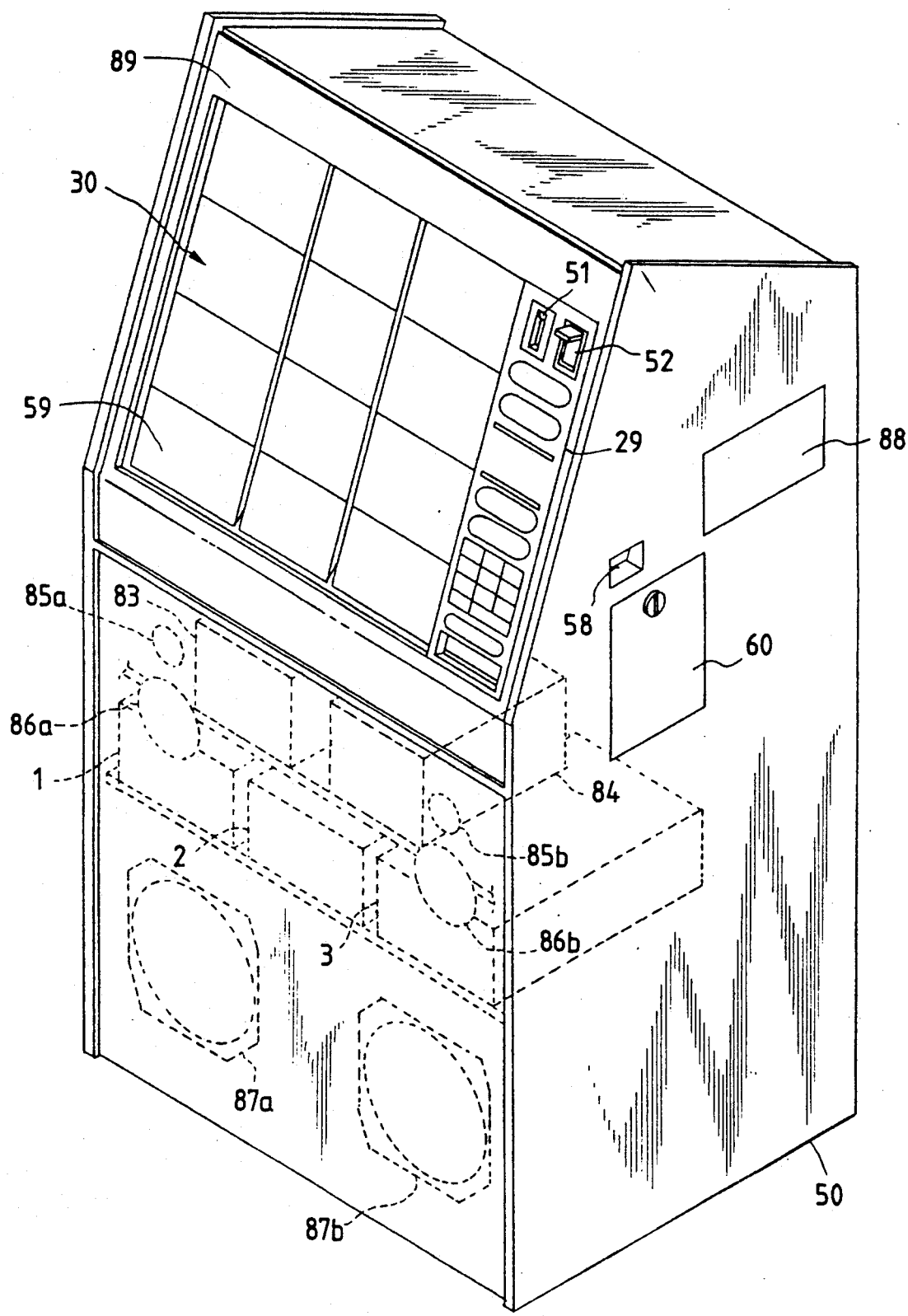
FIG. 2 is a perspective view of an appearance of the player of FIG. 1.
Figure 4:
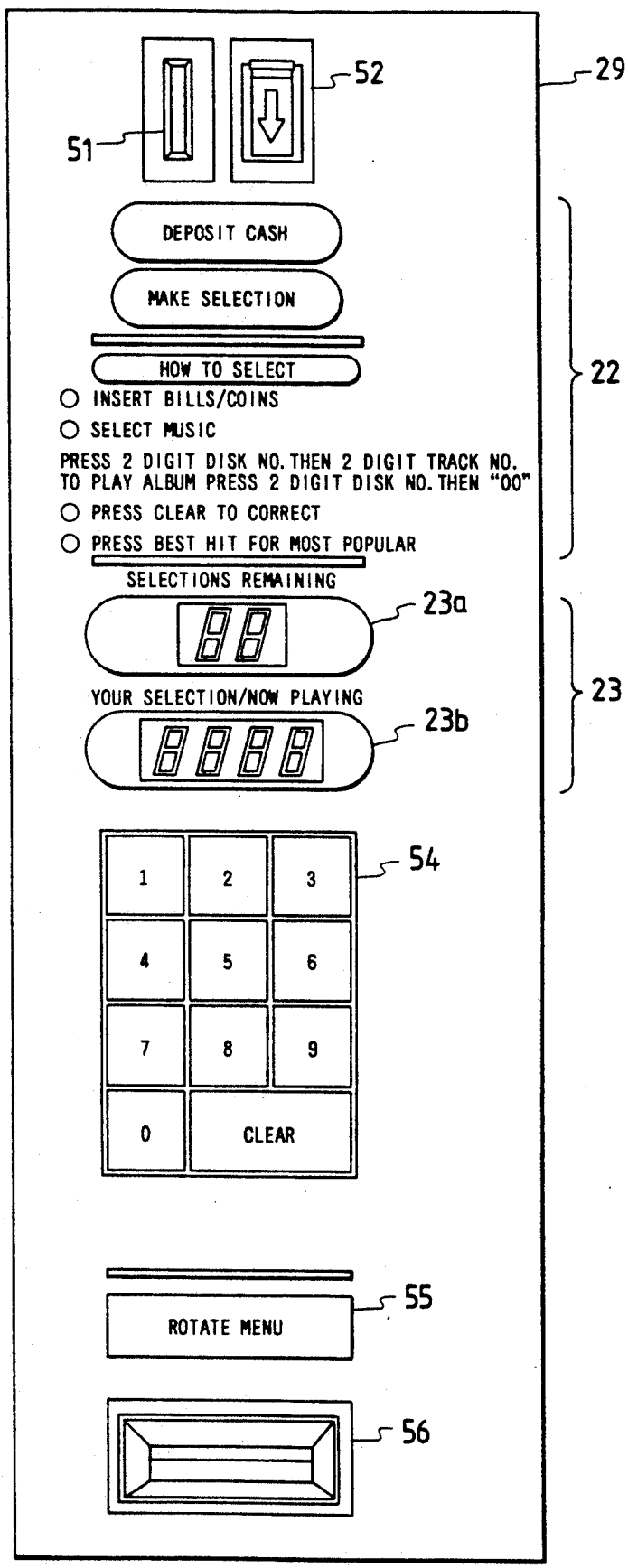
FIG. 4 shows an operating board of the player.

As shown in FIGS. 2, and 3(a) and 3(b), the jukebox according to the present invention is formed within a cabinet 50 which is shaped like a parallelopiped, with the upper portion of the front side being slanted. A space within the cabinet 50 is partitioned into three cubicles by partitioning walls 41 and 42. The slanted portion of the front side above the partition wall 41 contains an operation panel 29 and a display panel 30. On the operation panel 29, a coin slot 51 and a repaying lever 52 are located in the uppermost portion thereof, as shown in FIG. 4. A display plate 23 of the illumination display 22 is located below them. Further, a remainder display 23a and a title display 23b, which form the numeral display 23, underlie the illumination display 22. Ten keys 54, a clear key and a menu turn key 55 underlie the numeral display 23. The ten keys 54 and the menu turn key 55 form part of the keyboard 21. A note deposit slit 56 is located in the lowermost portion of the operation panel 29. The coin slot 51, the repay lever 52, and the note slit 56 partially form a money collection unit 27 which checks and determines a kind of coin or note as inserted from the coin slot 51 or the note slit 56, and sends a signal representing the result of the determination to the controller 11. When a coin and a note are inserted and the repay lever 52 is operated before a piece of music is selected, the coin is returned to the operator via a receptacle 58 (FIG. 2) on the right side of the cabinet, and the note is returned to the operator through the note slit 56. After the musical piece is selected, the coin and note are put in a coin box (not shown). To take out the coin box, a keyed door 60 (FIG. 2) on the right side of the cabinet is opened and the coin box is taken out of the cabinet.

Figure 5:
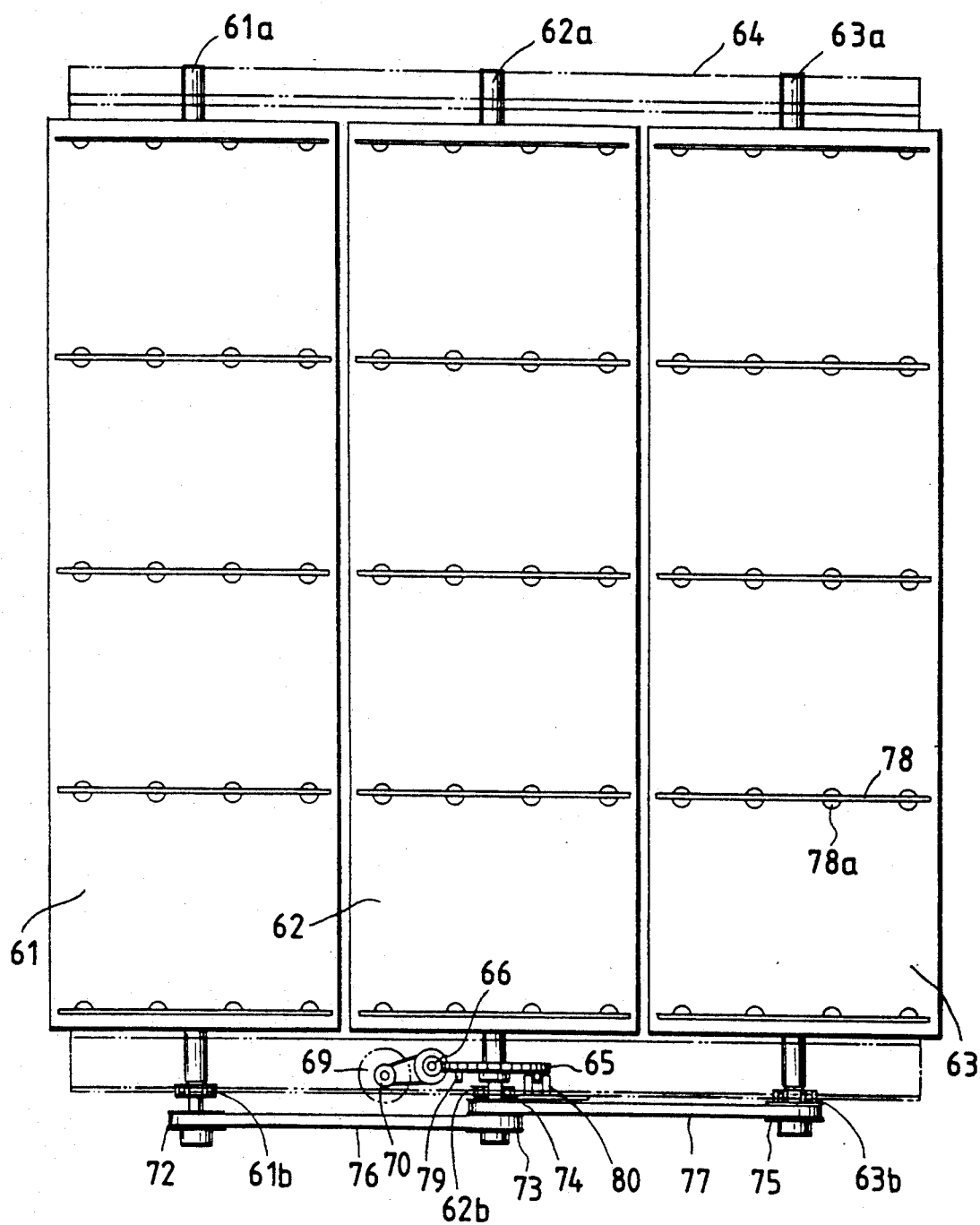
FIG. 5 is a plan view showing the structure of the menu display section.

The display panel 30 is a transparent plate 59 made of, for example, glass. Inside the transparent plate 59, a support member 64 having a U-shaped cross section is disposed side by side. Three trihedral column members 61–63 for menu display are respectively set within and supported by the support member 64. The trihedral column members 61–63 are provided as menu boards. The trihedral column members 61–63 are respectively provided with rotating shafts 61a to 63a. Each shaft axially extends through the respective trihedral column and beyond both ends of it, as shown in FIG. 5. One of the ends of each of the shafts 61a–63a is tapered on the circumferential surface to have a slightly reduced diameter. The support member 64 is fixed to the cabinet 50. Three holes are formed in the top side of the U-shaped support member 64. The other ends of the shafts 61a–63a are inserted into those holes. Three bearings 61b–63b are formed in the bottom side of the support member 64. One end, (i.e., the portion reduced in diameter), of the shafts 61a–63a are disposed through the bearings, respectively. In this way, the support member 64 rotatably supports the rotating shafts 61a–63a.

Figure 6:
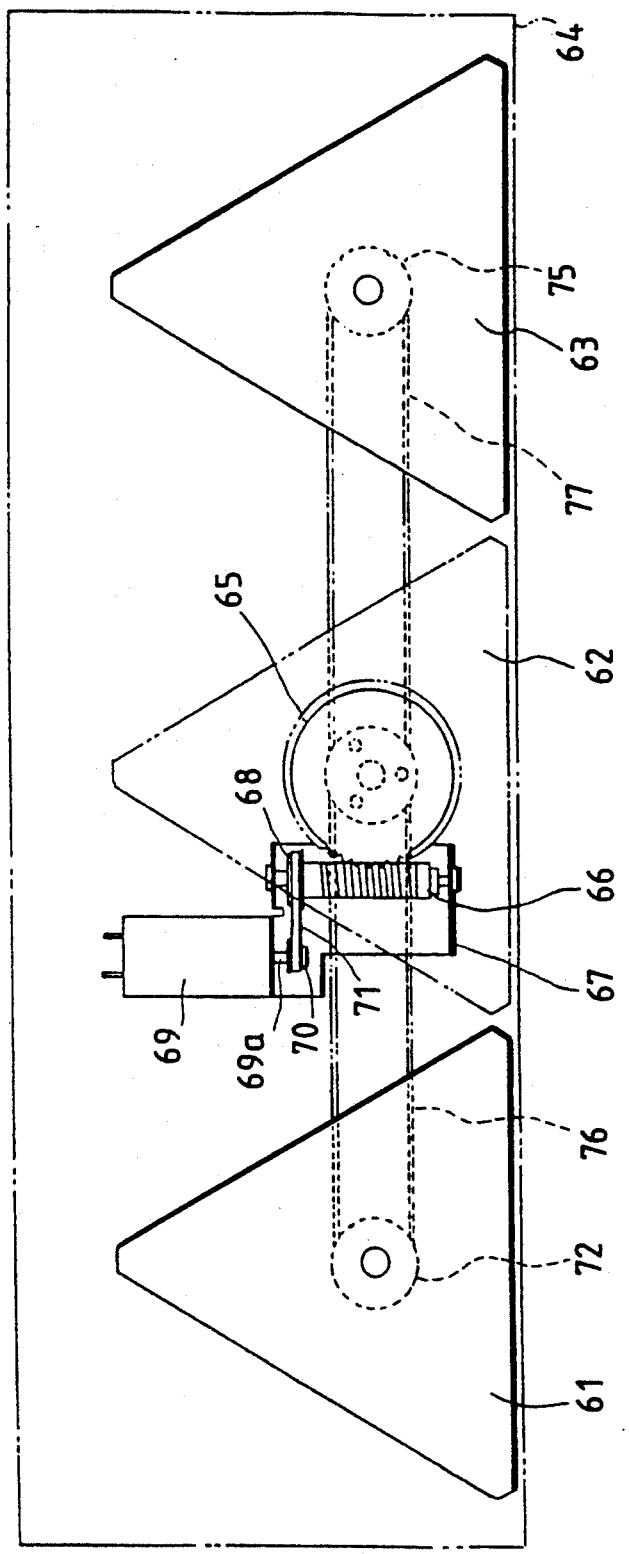
FIG. 6 is a top view showing the structure of the menu display section.

A spur gear 65 is fixed to the center rotating shaft 62a of the trihedral column member 62. More specifically, it is fixed to the end portion of the shaft which is more inwardly located than the bearing 62b. As shown in FIG. 6, the spur gear 65 is in mesh with a worm gear 66. The worm gear 66 is rotatably supported by a support member 67. A pulley 68 is provided so as to rotate in synchronism with the worm gear 66. A motor 69 is mounted to the support member 67. A pulley 70 is fixed to a rotating shaft 69a of the motor 69. A belt 71 is wound around the pulleys 68 and 70. Accordingly, rotation of the motor 69 (i.e., rotation of shaft 69a) is transferred to the trihedral column member 62, through the pulley 70, belt 71, pulley 68, worm gear 66, and the spur gear 65.

As shown in FIGS. 5 and 6, a pulley 72 is fixed to the reduced-diameter portion of the rotating shaft 61a, which is protruded outside the U-shaped support member 64. Similarly, pulleys 73 and 74 are fixed to the reduced-diameter portion of the shaft 62a, and a pulley 75 is fixed to the reduced-diameter portion of the shaft 63a. A belt 76 is wound around the pulleys 72 and 73. A belt 77 is wound around between the pulleys 74 and 75. The pulleys 72–75 have the same diameters. With such an arrangement, when the trihedral column member 62 rotates, the trihedral column members 61 and 63 rotates at the same speed as that of the trihedral column member 62. Each of the three surfaces of each of the trihedral column members 61–63 contains four menu areas which are partitioned by horizontal guide members 78 and arrayed vertically. Semicircular projections 78a are equidistantly arrayed on one or both sides of each guide member 78. In each menu area, a jacket of one of the CD cases are put between the guide members 78, and the semicircular projections 78a prevent the jackets from slipping off.

Figure 7:
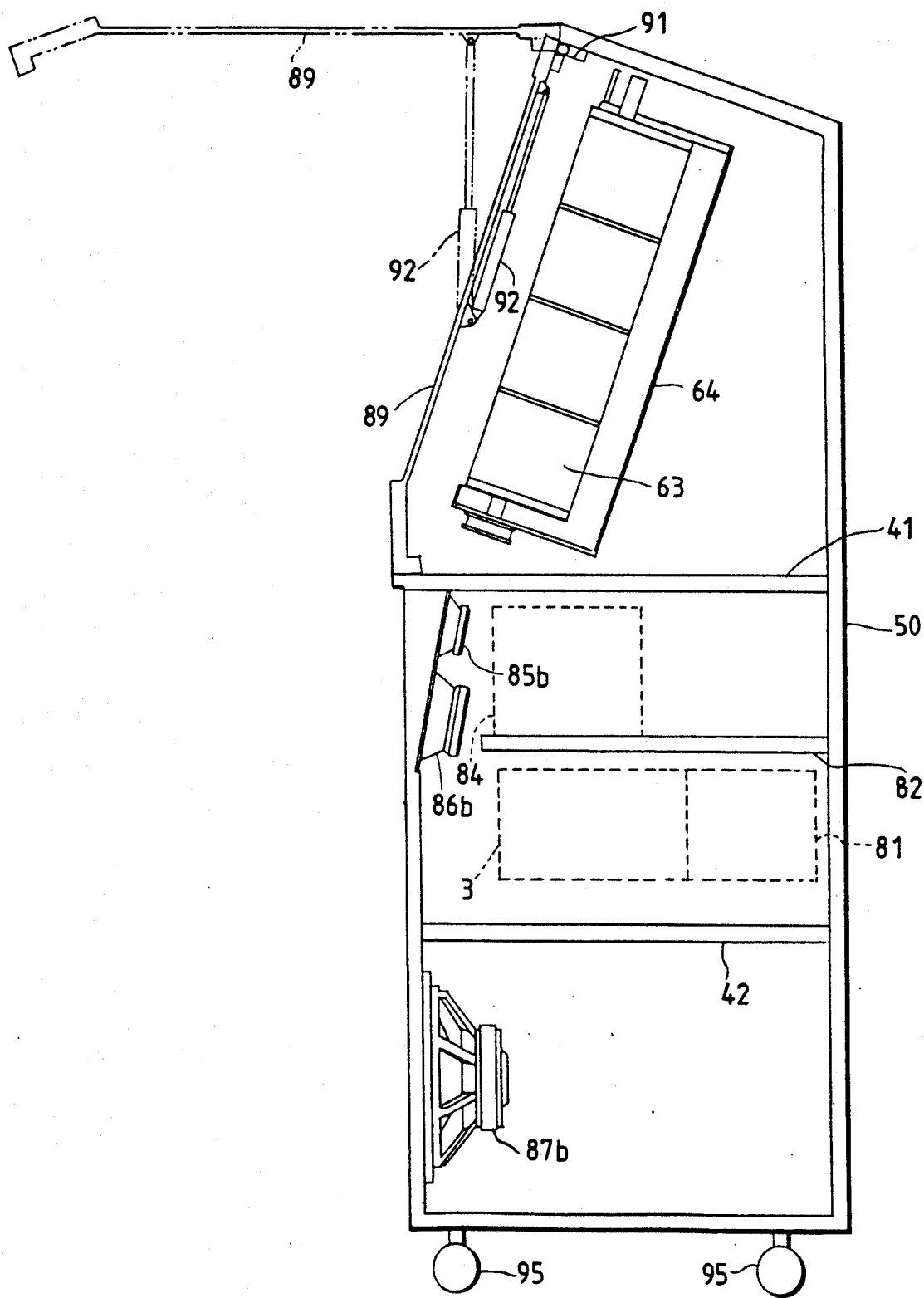
FIG. 7 is a side view of the player when it is uncovered and a door is left open.

As shown in FIG. 7, the slanted portion of the front side of the cabinet is used as a door 89 as indicated by a two dot chain line. Hinges 91 are provided at the top corners of the front side of the cabinet 50. The door 89 can be turned about the hinges. When the door is opened, it may be left open by an arm member 92 with a damper function. Under this condition, menu replacement is allowed. A door sensor 25 mounted in a proper location on door 89 (not shown in FIG. 7) is provided to sense when door 89 is opened and closed.

As illustrated in FIG. 5, three stick-like members 79 are fastened to the face of the spur gear 65 closer to the bearing 62b. The members 79 are disposed on a circumference on the gear face equiangularly, i.e., at 120° intervals. A photo sensor 80 which functions as a photo coupler is mounted at a location on the support member 64 which corresponds to the stick-like members 79. When the member 79 reaches the location of the photo sensor 80, the photo sensor 80 generates a position detect signal, which in turn is supplied to the controller 11.

A space defined by the partitioning walls 41 and 42 within the cabinet 50 is used for housing audio units. In the audio-unit space, the CD players 1–3 are fixed to the partitioning wall 42 (FIG. 3(a)). Those players are placed with their magazines facing the front side of the player. The front panel covering the front side of the space in the cabinet 50 is removably fastened to the cabinet. With such front panels, when magazines or disks are replaced by new ones or new magazines or disks are set, a serviceman, for example, may make an access there. In a place on the rear side of the CD player 2, a power supply 81 (FIG. 3(b)) is installed for supplying electric power to the CD players 1-3, controller 11, amplifiers, and the like. A shelf 82, which is located above the CD players 1-3 within the audio unit space, is fixed to the cabinet 50. A control unit 83 and an amplifier unit 84 (FIGS. 2 and 3(a)) are placed on the shelf 82. The control unit 83 contains the communication selector 10, the controller 11, and the motor drive circuit 24. The amplifier unit 84 contains the audio line selector 12 and the amplifier 13. A pair of tweeter speakers 85a and 85b and a pair of squawker speakers 86a and 86b are disposed on both sides of the front of the audio-unit space of the cabinet 50, as shown.

A space below the partitioning wall 42 within the cabinet 50 is used as a woofer audio section. A pair of woofer speakers 87a and 87b are installed on the front of the woofer section. The tweeter speaker 85a, the squawker speaker 86b, and the woofer speaker 87a form a left speaker system 14. The tweeter speaker 85b, the squawker speaker 86b, and the woofer speaker 87b form a right speaker system 15.

Right and left speakers 88 (left speaker is not illustrated) for sound diffusion are installed on the upper portions of both sides of the cabinet 50.

Four wheel means 95 are mounted on the bottom surface of the cabinet 50, and facilitate moving the cabinet.

An operation of the disk storage/select player thus arranged will be described with reference to FIGS. 8 through 13. Description will proceed along a control flow by the controller 11.

Upon power on, a microprocessor (not shown) in the controller 11 initializes various types of flags and counters. The microprocessor starts to execute a routine to check if the CD player is present. Following the execution of the routine, the microprocessor successively executes a disk data read routine, a play control routine, and a data exchange control routine to exchange data at the time of door being open. The microprocessor repeatedly executes four routines, and interruptively executes a music-select entry routine.

Figure 8:
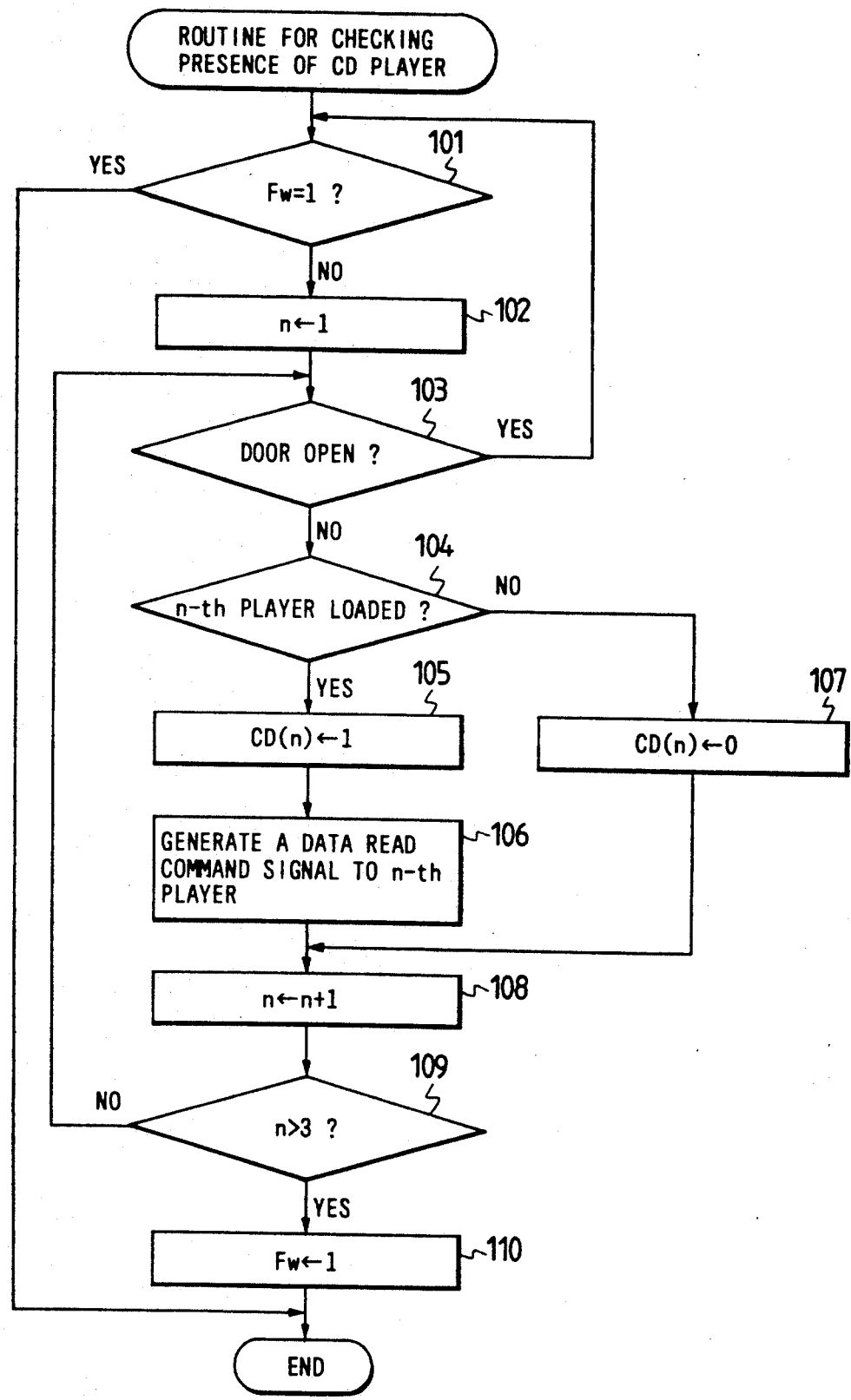
Figure 9:
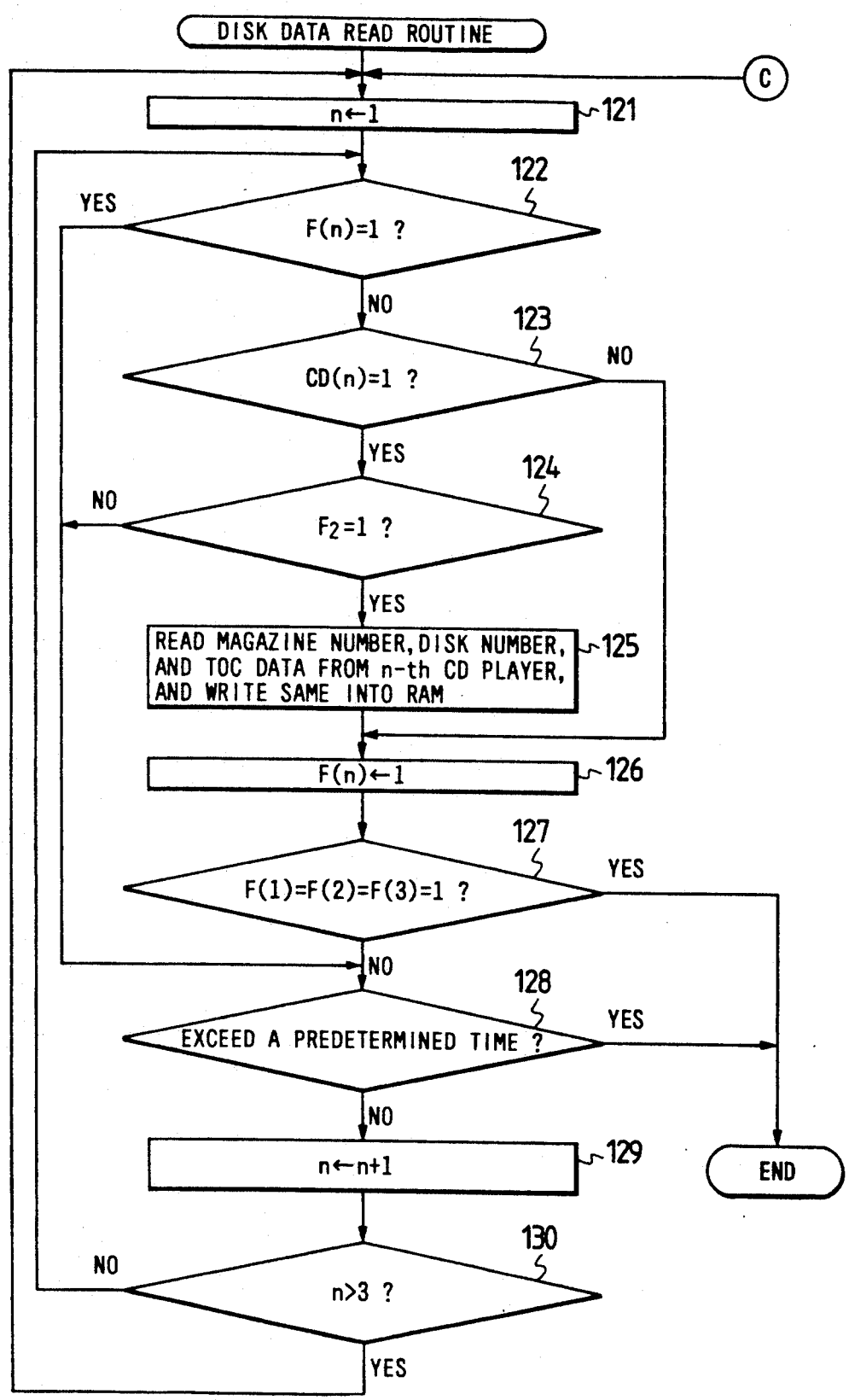

In the player check routine, the microprocessor in the controller 11 checks if an operation flag Fw is "1" at the time of power on (step 101 in FIG. 8). If Fw=1, the microprocessor ends the execution of this routine because this state of the flag Fw indicates that the routine has been completed after power on. If Fw=0, this state indicates that the routine has not yet been executed. Accordingly, the microprocessor sets variable "n" to be equal to "1" (step 102), and checks if the door 89 is open (step 103). If the door 89 is open, then the microprocessor check if the n-th CD player is set (step 104). More specifically, the microprocessor selects the n-th CD player by the communication line selector 10, and checks if the confirmation voltage is present in the confirmation line. Hereinafter, the CD player 1 is called a first CD player; the CD player 2 a second CD player; the CD player 3 a third CD player. If the confirmation voltage is present, the microprocessor sets the flag CD (n) to "1" (step 105), and generates a data read instruction signal to instruct reading of TOC (table of contents) from a disk loaded to the magazine, and applies the instruction signal to the n-th CD player (step 106). After the step 106 or 107 is Then, the microcomputer checks if the variable "n" is more than "3" (step 109). If n<3, the microprocessor advances to step 103. If n>3, it sets the flag Fw to "1" (step 110). Then, it completes the execution of the present routine. As the results of the execution of the routine, the contents of the flags CD(1), CD(2), and CD(3), i.e., the presence or absence of the CD players 1-3, are set up.

For ensuring safety, the system of the player may be designed such that when the magazine, even if it is single in number, is not set to the player, generation of the confirmation voltage is stopped, and the controller 11 ignores the CD player.

In each of the CD players 1-3, when a TOC data read instruction signal is received, TOC data is read out of the disk loaded by a pick-up. The TOC data read out, together with magazine numbers and disk numbers, are written into an internal RAM (not shown) for each player. After the operation of writing and reading TOC data to and from the disks is completed, each of the players 1-3 sets a flag F2 indicative of end of data read operation to "1". The flag F2 is generated by an internal controller (not shown) of each player. The flag is reset to "0" at the time of power on and when one of the magazines of each player is pulled out. The magazines of each player are respectively provided with switches (not shown) to detect loading or unloading of the magazines.

Following the execution of the player check routine, the disk data read routine is executed by the microprocessor of the controller 11. In the disk data read routine, the microprocessor sets the variable "n" to "1" (step 121 in FIG. 9), and checks if a flag F(n) indicative of read completion is equal to "1" (step 122). If F(n)=0, the microprocessor checks if flag CD(n) is equal to "1" (step 123). If CD(n)=0, the microprocessor advances to step 126 since this state of the flag indicates that the n-th player has not yet been loaded. When CD(n)=1, the microprocessor reads the flag F2 from the n-th CD player, and checks if the flag F2 is equal to "1" (step 124). When n=1, the microprocessor reads the flag F2 from the CD player 1, and checks if it is equal to "1". If F2=1, the microprocessor reads a magazine number, disk number and TOC data out of the n-th player, and writes them into a TOC data map of the RAM 20 (step 125). Then, the microprocessor sets the data read completion flag F(n) to "1" (step 126), and checks if the data read completion flags F(1), F(2), and F(3) are all equal to "1" (step 127). If F(1)=F(2)=F(3)=1, the microprocessor ends the execution of the disk data read routine since it judges that this state of the flag indicates that the TOC data has been read out of the existing CD player. If F(1)=F(2)=F(3)≠1, the microprocessor checks if a predetermined time elapses from the start of the disk data read routine (step 128). If that time elapses, the microprocessor judges that it is impossible to read TOC data out of the disk, and ends the execution of the routine. If the time does not yet elapse, the microprocessor adds "1" to the variable "n" (step 129), and checks if the variable "n" is more than 3 (step 130). If n<3, the microprocessor goes to step 122. If n>3, it goes to step 121. In step 122, F(n)=1, the microprocessor judges that TOC data has been read out of the n-th CD player, and goes to step 128. In step 124, if F2=0, the microprocessor judges that in the n-th CD player, TOC data has not yet been read out, and proceeds to step 128.

As shown in FIG. 14, a TOC data map is formed in the RAM 20. By executing the disk data read routine, TOC data (1) to (6) are written into the TOC data map for each magazine. When the disk is absent, the data preceding to the memory location is erased.

Figure 10:
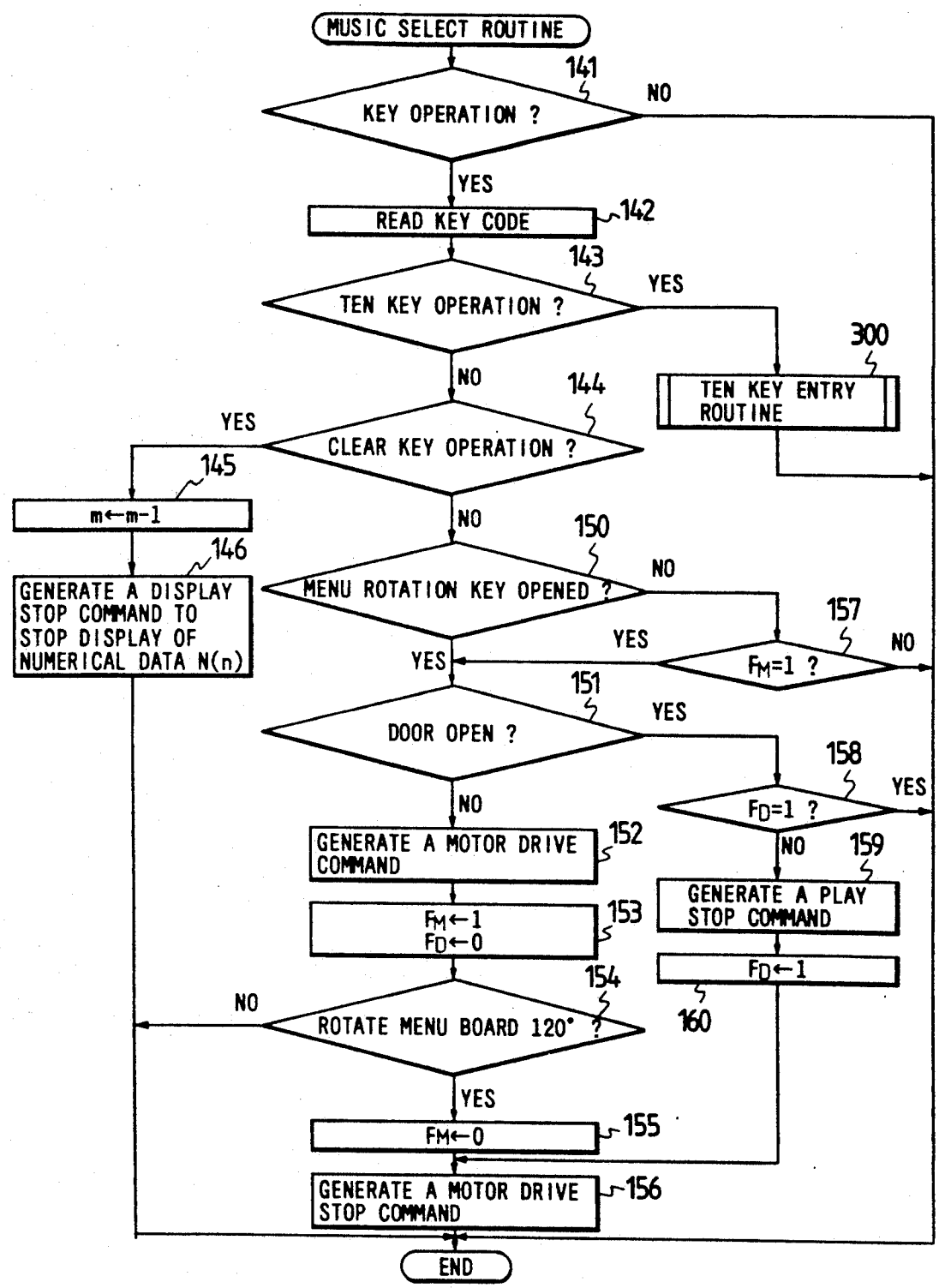

The music-select entry routine, which is interruptively executed, will be described. In this routine, the microprocessor checks if a key operation is present, by a fixed-time interrupt, as shown in FIG. 10 (step 141). If the answer is YES, key codes corresponding to operated keys in the keyboard 21 of the controller 11 are successively loaded into an input buffer (not shown). When the microprocessor reads in the key code, the buffer stage for the key code is shifted and the key code therein is lost. When the machine receives no money, the key operation is ignored and no key code is stored in the buffer. When a key code is stored in the buffer, the microprocessor reads it (step 142), and checks on the basis of the key code if the operated key is a ten key (step 143). If the answer is YES, the microprocessor executes a ten-key entry routine (step 300). When no key code is stored in the input buffer, the microprocessor returns to the execution of another routine.

In the ten-key entry routine, as shown in FIG. 11, the microprocessor converts the read key code to numerical data N(m) (step 301). Here, "m" is a variable, and its initial value is "1", as will be described later. In the numerical data, N(1) designates a magazine number; N(2) a disk number; N(3) the second digit in the integer part of figures representing a track number; N(4) the first digit of the same. To display figures of the numerical data N(m) by the title display 23b, the microprocessor supplies the numerical data N(m) and the variable (m) to the drive circuit 26 (step 302). A value of the variable "m" indicates a digit position from the left in the display window of the title display 23b. Accordingly, the drive circuit 24 drives the display 23b so that a digit specified by the numerical data N(m) is displayed at a position as indicated by the variable "m". After supplying the numerical data N(m) and the variable (m) to the drive circuit, the microprocessor checks if data is stored in a memory location in the TOC data map of the RAM 20, that is specified by the numerical data N(m) (step 303). When m=1, the microprocessor checks if data is present in a memory location corresponding to a magazine number N(m). When m=2, the microprocessor checks if a disk of the disk number N(2) is set in the magazine of the magazine number N(1). When m=3, 4, the microprocessor checks if the disk of the disk number N(2) contains a track of a track number N(m) whose second digit in the integer part is N(3), and the first digit is N(4). When data is not stored in the memory location in the TOC data map as specified by the numerical data N(m), the microprocessor sends a display stop command to the drive circuit 24, in order to stop the display of he numerical data N(m) (step 304), and then ends the execution of the routine. When data is present in the memory location as specified by the numerical data N(m), the microprocessor adds "1" to the variable "m" (step 305), and checks if the variable "m" is larger than 4 (step 306). If m<4, the microprocessor ends the execution of the routine. If m>4, the microprocessor judges that four digits necessary for selecting a piece of music have been by a ten key operation, and uses for music select data S(y), four digits, digit N(1) at the fourth position, digit N(2) at the third position, digit N(3) at the second position, and digit N(4) at the first position, and further sets the variable "m" to "1" (step 308). "y" designates a variable which is set to an initial value "1" when the power supply is turned on. The variable "y" indicates an order of writing the selected music into a play-order list within the RAM 20. Then, the the variable "t" equal to the sum value (step 309).

The microprocessor reads music select data S(t) from a memory location as indicated by the variable "t" of the play-order list (step 310). The microprocessor checks if the music select data S(t) is equal to the music select data S(y) (step 311). The variable "x" indicates the music number of a music being played in the play-order list. If S(t)≠S(y), the microprocessor adds "1" to the variable "t" (step 312), and checks if the variable "t" reaches the variable "y" (step 313). When t<y, the microprocessor advances to step 310. When t>y, the microprocessor judges that the same music select data as the music select data S(y) entered this time is not listed, as the music to be played, in the play-order list, and writes music select data S(y) in a memory location as indicated by the variable "y" of the play-order list (step 314). In case where the magazine number N(1) is 3, disk number N(2) is 5, track number N(3), viz., the second digit of the track number is 0, and track number N(4), viz., the first digit of the track number is 6, "3506" as the music select data S(y) is written into the memory location. After the music select data S(y) is written, the microprocessor adds "1" to the variable "y" (step 315), and ends the execution of the routine. When S(t)>S(y), the microprocessor judges that the same music select data as the music select data S(y) entered this time is listed, as the music to be played, in the play-order list, and ends the execution of the routine without writing the music select data S(y). The play-order list is as shown in FIG. 15, for example. As shown, a plurality of music select data S(1), S(2). . . . are listed in the order of playing music pieces. In a play mode, the music selected data S(x) of a title as indicated by a variable "x" is read out and played, as will be described later.

In step 143, if the operated key is a ten key, the microprocessor checks if the operated key is a clear key (step 144). If it a clear key, viz., the answer is YES, the microprocessor subtracts "1" from the variable "m" (step 145), and issues a display stop command to the drive circuit 24, in order to stop the display of numerical data N(m) (step 146). Let us consider a case where with an intention of entering the magazine number 3, an operator mistakenly enters "2" by the related ten key. In this case, the figure "2" disappears in the display window of the title display 23b, and the machine is ready for additional entry of a correct magazine number by operating a ten key.

When the operated key is not a clear key, the microprocessor checks if the operated key is the menu rotation key 55 (step 150). If the menu rotation key 55 is operated, the microprocessor checks whether the door 89 is open or not (step 151). The check is made by using an output signal of the door sensor 25. If the door 89 is open, the microprocessor issues and sends motor drive command to the drive circuit 24 (step 152), d sets "1" in a motor drive flag DM, and resets a door flag FD to "0" (step 153). Upon receipt of the motor drive command, the drive circuit 24 drives the motor 69. With rotation of the motor 69, the rotation is transferred to the trihedral column member 62, through the pulley 70, belt 71, pulley 68, worm gear 66, and the spur gear 65. Further, it is transferred to the trihedral column member 61 through the pulley 73, the belt 76, and the pulley 72, and to the trihedral column member 63 through the pulley 74, the belt 77, and the pulley 75. Consequently, the trihedral column members 61–63 are rotated at equal speeds in the same direction, e.g., counterclockwise. When the trihedral column members 61–63 are rotated by 120 degrees, the stick-like members 79 reach the position of the photo sensor 80, which in turn generates a position detect signal. After executing the step 153, the microprocessor checks whether or not the trihedral members 61-63 have been turned by 120 degrees (step 154). When the photosensor 80 generates a position detect signal, the microprocessor judges that the member 61-63 have been rotated by 120 degrees, and resets the motor drive flag FM to "0" (step 155), and then generates and applies a motor drive stop command to the drive circuit 24 (step 156). In response to the motor drive stop command, the drive circuit 24 stops the rotation of the motor 69. Accordingly, the trihedral column members 61-63 are stopped at the 120-degree turned positions. Under this condition, new music select menus are presented to an operator. In other words, every time the menu rotating key 55 is operated, the trihedral column member 61-63 are turned by 120 degrees, and old music select menus are replaced by new ones. In this instance, a maximum of 36 disks may be provided for the music select menu. The menus of 12 disks may be presented at one time. The drive circuit 24 employs a duty-ratio control for controlling the motor 69. In response to a motor drive stop command, the drive circuit gradually changes the duty ratio to brake and stop the motor 69.

In step 150, when the menu rotation key 55 is not operated, the microprocessor checks whether the flag FM is equal to "1" or not (step 157). If $F_M=1$, the motor 69 is being driven and the select menus are being changed. At this time, the microprocessor goes to step 151 where it checks if the door 89 is open. This is done to deal with a situation that during the change of the menu, the door 89 is opened. When the door 89 is open, the microprocessor checks if the flag FD is equal to "1" (step 158). If FD=0, the microprocessor generates a play stop command (step 159). If a music piece is being played, this command forcibly stops the playing. The microprocessor sets "1" to the flag FD (step 160), and goes to step 156 where it generates and applies a motor drive stop command to the drive circuit 24, thereby to stop the rotations of the trihedral column members 61-63. If FD=1, the microprocessor stops the execution of the routine, because under this condition, the playing has been stopped and the drive of the motor 69 is also stopped. After the door 89 is closed, the microprocessor advances to step 152. Accordingly, even where the trihedral column members 61-63 are at a standstill, without rotation of 120 degrees, those members are turned to direct the music select menu toward an operator, and then comes to stop.

The play continue routine will be described.

Figure 12A:
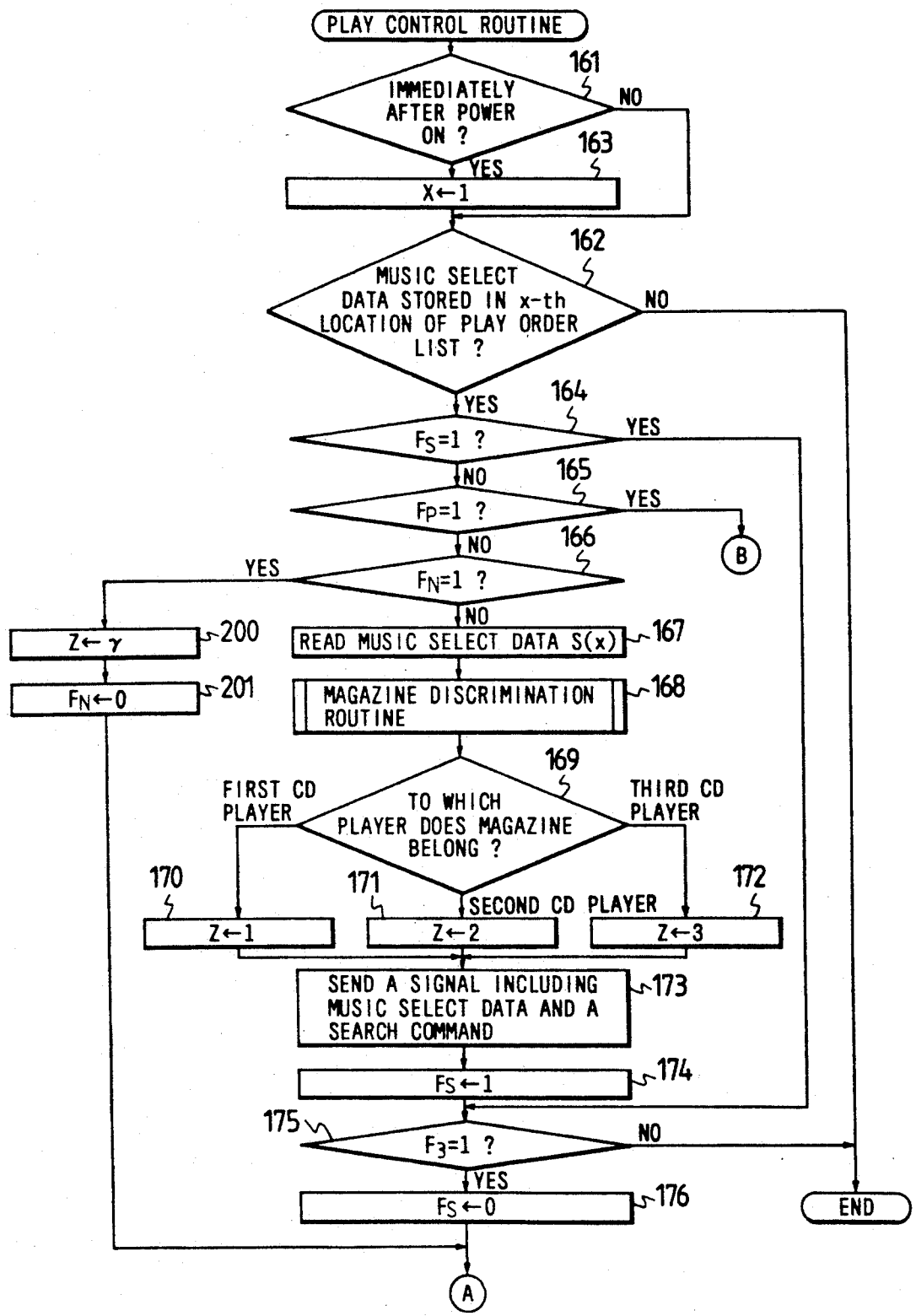

In the play control routine, as shown in FIGS. 12(a) and 12(b), the microprocessor first checks if the time is immediately after power on (step 161). If it is not immediately after power on, viz., the answer is NO, the microprocessor checks if must select data has been stored in the x-th memory location of the play-order list (step 162). If the answer is YES, the microprocessor sets the variable "x" to "1" (step 163), and goes to step 162. The check as to whether or not music select data is stored in the x-th memory location of the play-order list, is carried out by checking if the number "y" for writing music select data reaches the x-th order. If the music select data is not stored in the x-th memory location of the play-order list, the microprocessor stops the execution of this routine. If the music select data is stored, the microprocessor checks if a search flag FS, a play flag FP, and a next-music standby flag FN are each equal to "1" (steps 164 to 166). If FS=0, none of the CD players are in a search mode. If FP =P, none of the players are also in the search mode. If FN=0, none of the players are in a stand-by mode for the music to next be played, and accordingly, the microprocessor reads the music select data S(x) out of the music select list (step 167). Then it executes a magazine discrimination sub-routine to discriminate a magazine number from the music select data S(x) as read (step 168). This sub-routine obtains the fourth digit of the music select data S(x) in the form of a magazine number M(x). For example, the microprocessor multiplies music select data S(x) by 0.001. The microprocessor then checks to which of the CD players the magazine M(x) thus obtained belongs (step 169). If the magazine number M(x) is any of 1-3, the magazine belongs to the first CD player 1, and the microprocessor sets the variable "z" to "1" (step 170). If the magazine number M(x) is any of 4 to 6, the magazine belongs to the second CD player 2, and the microprocessor sets the variable "z" to "2" (step 171). If the magazine number M(x) is any of 7 to 9, the magazine belongs to the third CD player 3, and the microprocessor sets the variable "z" to "3" (step 172). The microprocessor sends a signal containing a search command and music select data S(x) to the z-th CD player, in a predetermined format (step 173), and sets "1" in the search flag FS in order to indicate a search operation being set up (step 174).

When the z-th CD player receives the search command as well as the music select data S(x), the player operates in accordance with a magazine number, disk number and track number as indicated by the music select data S(x). If the music select data S(x) is expressed by "abcd", for example, the magazine of the magazine number "a" is selected, and a disk "b" is selected from among the disks contained in the magazine, and it is placed on a turn table. Then the disk is turned, a track of the track number "cd" is searched and the pick-up is moved and positioned just above the track. Then, the pick-up stops there and the player is in a stand-by mode. The above sequence of operations is known and no further description will be given. In this mode, "1" is set in a play stand-by flag F3.

Following the execution of step 174, the controller 11 checks if the play stand-by flag F3 of the z-th CD player is set to "1" (step 175). In step 164, if FS=1 the controller 11 straightforwardly goes to step 174. If F3=1, the controller judges that the search operation ends, and resets the search flags FS to "0" (step 176), send a play command signal to the z-th CD player (step 177), and sets "1" to the play flag EP in order to indicate a music being played (step 178). In the z-th CD player, in response to the play command signal, a play stand-by flag F3 is reset to "0", and the player starts to play a music in the track of the track number "cd". Audio signals of the right and left channels, that are outputted from the z-th CD player, are supplied through the audio line selector 12 to the amplifier 13. The speakers 14 and 15 are driven to produce a reproduced sound. When the play of the music piece in the track of the track number "cd" is completed, the controller of the z-th CD player sets "1" in a play end flag F4. During the play of the music, the title display 23b displays the magazine number, disk number, and track number relating to the music being played.

After executing step 178, the controller 11 checks if the play end flag F4 of the z-th CD player is "1" (step 180). In step 65, if FP=1, the controller straightforwardly goes to step 180. If F4 =1, the controller judges that the play on the music select data S(x) is completed, and resets the play flag FP and the stand-by impossible flag "FE" to "0" (step 181). Then, the controller adds "1" to the variable "x" in preparation for the play of the next music select data (step 182), and completes the execution of the routine.

In step 180, if F4=0 the z-th CD player is playing a music piece, and hence it checks if the stand-by impossible flag FE is equal to "1" (step 185). If FE=1, the controller decides the z=r in step 194 to be given later. Under this condition, a piece of music of the music select data as stored in the (x+1)th location of the play order execution of the routine is ended. If FE=0, the controller checks if the music select data has been stored in the (X+1)th location of the play order list (step 186). If it is not stored, the execution of the routine is ended. If it is stored, then the controller checks if the search flag FS is equal to "1" (step 187). If FS =0, none of the players are not in a search mode, and the controller reads out the music select data S(x+1) (step 188). The controller executes a magazine discrimination subroutine to discriminate a magazine number from the read music select data S(x+1) (step 189). It further checks which CD player has the magazine of the magazine number M(x+1) (step 190). The operations in the steps 188, 189 and 190 resemble those in the steps 167, 168, and 169. If the magazine number M(x+1) is 1-3, the number is that of the first CD player 1. Then, the controller sets the variable "r" to be "1" (step 191). If the magazine number is 4 to 6, the number is that of the second CD player 2. Then, the controller sets the variable "r" to be "2" (step 192). If the magazine number is 7 to 9, the number is that of the third CD player 3. Then, the controller sets the variable "r" to be "3" (step 193).

After the execution of the steps 191, 192 or 193, the controller checks if the variable "z" is equal to the variable "r" (step 194). If z=r, a piece of music of the music select data is stored in the (x+19th) location of the play-order list is contained in the disk loaded to the z-th CD player. Accordingly, the controller sets "1" in the stand-by impossible flag FE (step 195), and ends the execution of this routine If z≠r, the music piece of the music select data stored in the (x+1)th location of the play-order list is not contained in the disk loaded to the z-th CD player. Accordingly, the controller sends a signal including the music select data S(x+1) and a search command to the r-th CD player (step 196). Further, it sets "1" in the search flag FS in order to indicate the search mode being progressing (step 197). Afterwards, the controller 11 checks if "1" is set in the play stand-by flag F3 of the r-th CD player (step 198). In step 187, if FS=1, the controller straightforwardly goes to step 198. If F3=1, the controller judges that the search mode ends, and resets the search flag FS to "0", and sets "1" in the next-music stand-by flag FN in order to indicate that the player is ready for the music select data as stored in the (x+1)th location (step 199), and ends the execution of the routine. If F3=0, the search mode is progressing and hence the controller immediately stops the execution of the routine.

In step 166, if FN=1, the controller judges that there is a CD player being in a stand-by mode or ready for a piece of music to next be executed, and makes the variable "z" equal to the variable "r" (Step 200). Further, it resets the next-music stand-by flag FN to "0" (step 201), and goes to step 177. In this step, it sends a play command signal to the r-th CD player.

Consider a case that a piece of music as indicated by the music select data as stored in the x-th location of the play-order list is A, and a piece of music as indicated by the music select data as stored in the (x+1)th location of the play-order list is B, and those music pieces A and b are contained in the disks of the different CD players. In this case, in the CD player having the disk containing the music piece B, during playing of the music piece A, the controller selects the disk, and searches the track of the music piece B, and sets the player in the stand-by mode. As the playing of the music A is completed, the player is released from the stand-by mode and starts to play the music piece B.

In storing music select data a designated in the lay order list, if the play order list has a small memory capacity, there is the possibility that the music select data exceeds the memory capacity to overflow. One may take such a measure that when the number of the playings of the music pieces reaches the number of the writings of the music select data, the music select data in the play order list are all erased, and the numbers "x" and "y" are set to "1".

The data exchange control routine for controlling data exchange when the door is open will be described. In this routine, the controller, more exactly the microprocessor in the controller, checks if a door-open discrimination flag FC is equal to "1" (step 211 in FIG. 13). If FC=0, the microprocessor checks if a door open flag FD is equal to "1" (step 212). If FD =0), the microprocessor stops the execution of the present routine. If FD=1, the microprocessor judges that the door 89 is open, and set "1" in the door-open discrimination flag FC (step 213) and ends the execution of the routine. If FC=1, the microprocessor checks if the door open flag FD is equal to "1" (step 214). If FD=1, the microprocessor judges that the door 89 is left open, and ends the execution of the present routine. If FD =0, the door 89 is closed, and the microprocessor generates a request command signal to question as whether or not there is a replaced magazine, and applies it to the CD players 1-3 (step 215). In the CD players 1-3, when the door 89 is opened, the magazine is removed or replaced by a new one, the internal controller of the related CD player sets the flag F2 to "1". Accordingly, the controller 11 sets the variable "n" to "1" (step 216), selects the n-th CD player, and checks if the flag F2 of the n-th CD player is equal to "1" (step 217). If F2=1, the controller resets a read-end flag F(n) to "0" (step 218), and adds "1" to the variable "n" (219). Specifically, when F2=1, the magazine of the n-th CD player is replaced by a new one. Accordingly, the controller resets the read end flag F(n) in order to read the TOC data of each disk of the n-th CD player. If F2=0, no magazine replacement is carried out, and hence the controller goes to step 219. After the step 219 is executed, the controller checks if the variable "n" is larger than "3" (step 220). If n<3, a step 217 is executed. If n>3, the controller checks if read end flags F(1), F(2), and F(3) are all equal to "1" (step 221). If F(1)=F(2)= and F(3) is "1", the controller ends the execution of the present routine. If any one of the flags F(1), F(2) and F(3) is "0", the controller coercively goes to step 121. Accordingly, a disk member of the disk set in the magazine of the n-th CD player whose magazine is removed or replaced by a new one, and the TOC data of the disk are written into the RAM 20.

In the above-mentioned embodiment, data are read out of the disks set to all of the magazines of the n-th CD player, and are loaded into the RAM 20. If required, data may be read out of only the disk as set to the magazine newly inserted.

Figure 16:
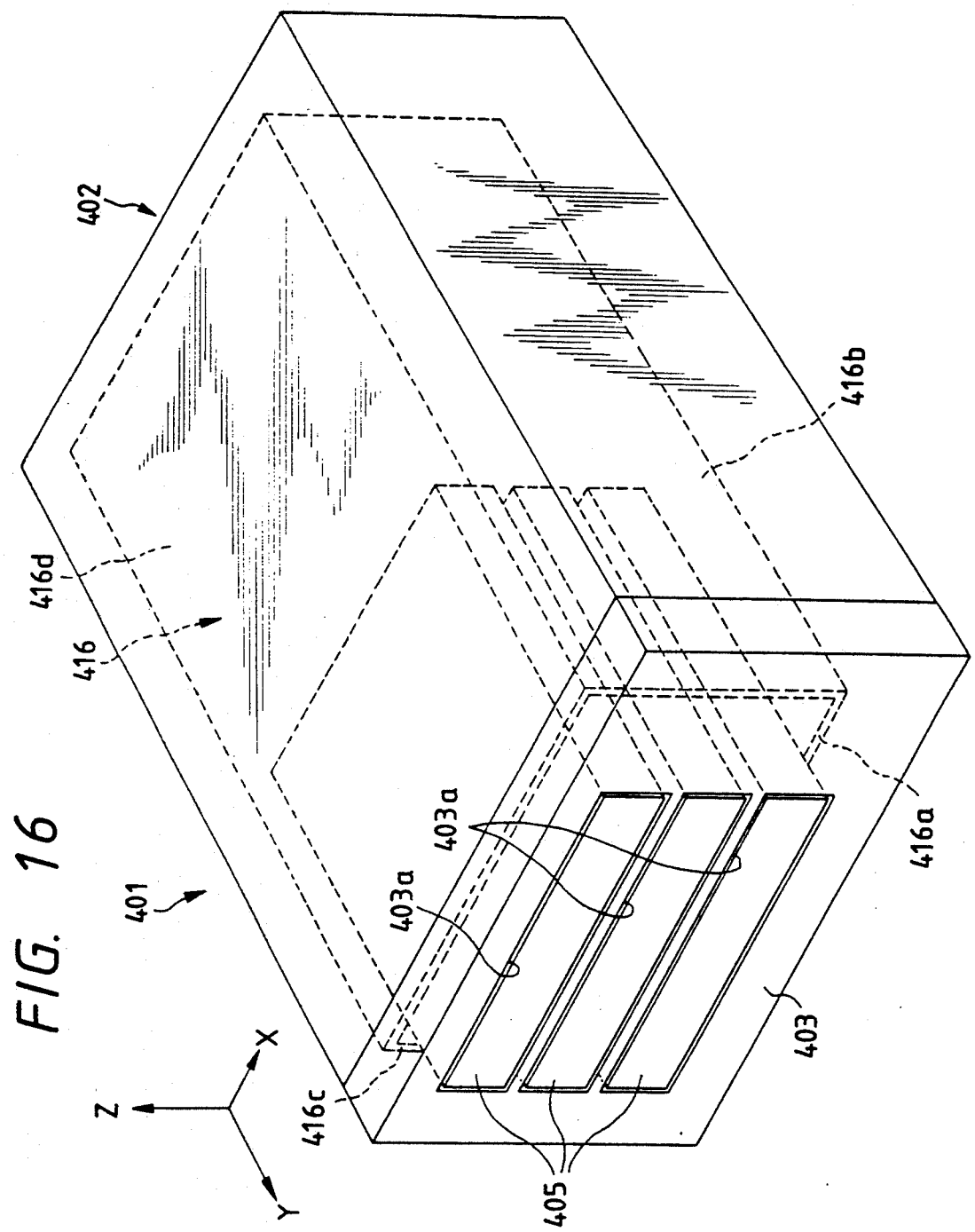
FIG. 16 is a perspective view showing a magazine contained disk player according to an embodiment of the present invention.

The construction of each of the magazine type CD players 1-3 will be described. In FIG. 16, reference numerals used are applied to all of the CD players.

As shown in FIG. 16, three rectangular openings 403a are vertically arranged in a front panel 403 of a player housing 402. Magazines 405 as disk containers are inserted through those rectangular holes into the magazine receptacles within the player housing. Each opening 403a is extended in the right and left directions. In the figure, the right and left are as viewed in the direction Y. Accordingly, the direction of an arrow X is the left direction. The direction of arrow Z is the up direction.

Figure 17:
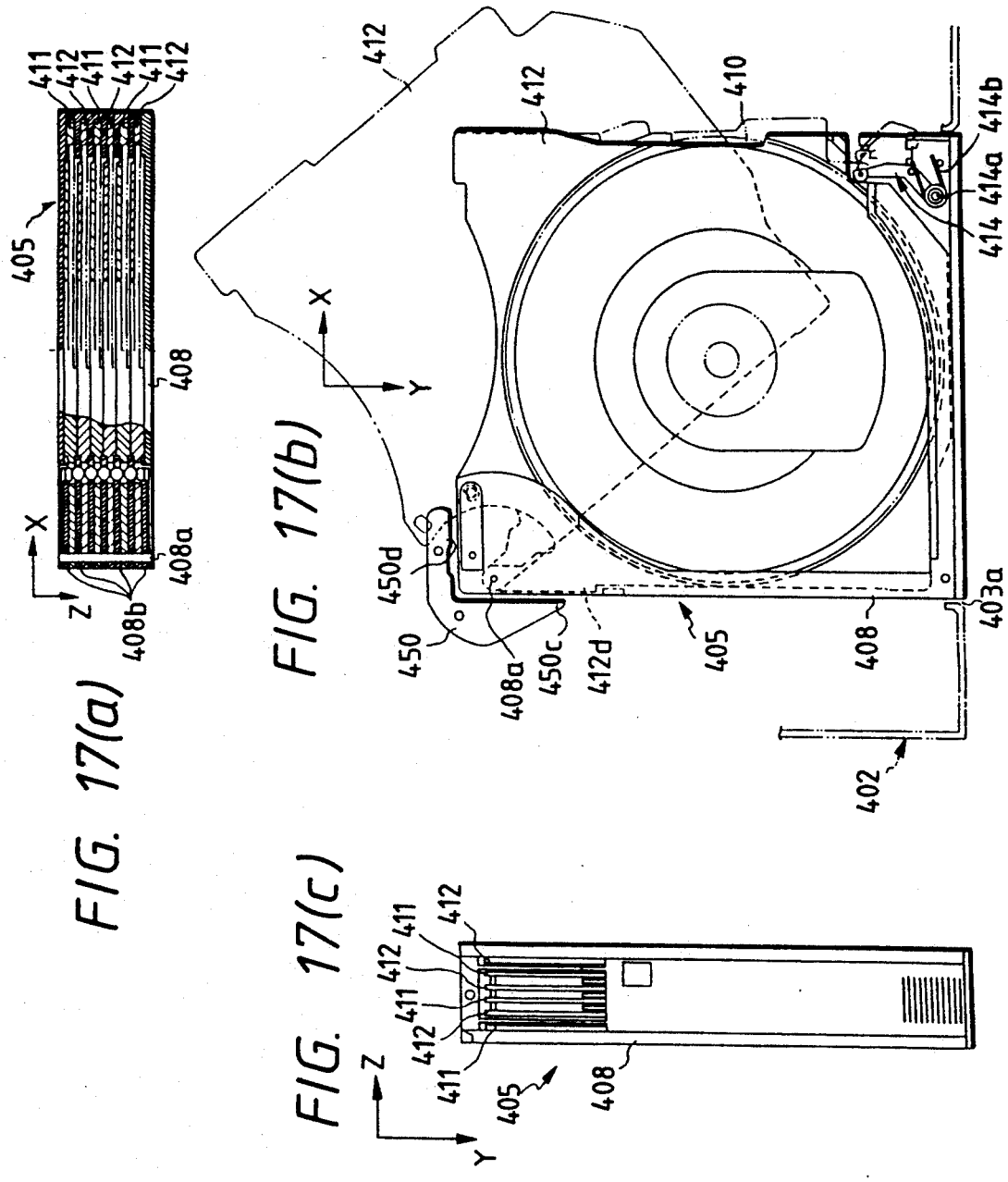
FIGS. 17(a) to 17(c) are a sectional view, a plan view and a side view, respectively, of a magazine loaded into the magazine contained disk player shown in FIG. 16.

As shown in FIG. 17(a) to 17(c), the magazine 405 includes a magazine main body 408 as a housing of a flat parallelopiped, and two types of three rectangular plate-like trays 411 and 412 carrying disks 410 on their major surfaces, totally six trays. The trays 411 and 412, or disks 410, are arrayed side by side at a predetermined pitch in the direction orthogonal to the disk carrying surface of a turn table to be given later, viz. in this instance, vertically (arrow Z and its opposition directions). Each tray 411 and 412 is swingable about a pivot 408a, which is located in the right rear end portion of the magazine main body 408, and extends in the direction in which the trays are arrayed (vertically). Further, these trays can be ejected from and set within the magazine main body 408 along each major surface.

The magazine main body 408 is provided with seven partition walls 408b, which are arrayed side by side vertically (arrow Z and its opposite directions). Each tray 411 and 412 is disposed between the two adjacent walls.

As shown in FIG. 17(b), a push lever 414 is provided at the left front end portion of the magazine body 408, and extends substantially back and forth (arrow Y and its opposite direction). One end (in this instance, the front end portion) of the push lever is mounted to the magazine main body 40 by a pin 414a so that the push lever is swingable about the pin. The pin extends vertically (arrow Z and its opposite direction). The other end, or the read end, of the push lever 414 may smoothly engage the free end of each tray 411 and 412. A spring member 414b is coupled with the push lever 414. The spring member 414b energizes the push lever 414 counterclockwise in FIG. 17(b), thereby to give the push level a tray pushing force.

The magazine 405 is described in detail in Japanese Patent Unexamined Publication No. 61-261853, for example, and hence no further description of it will be given.

Figure 18:
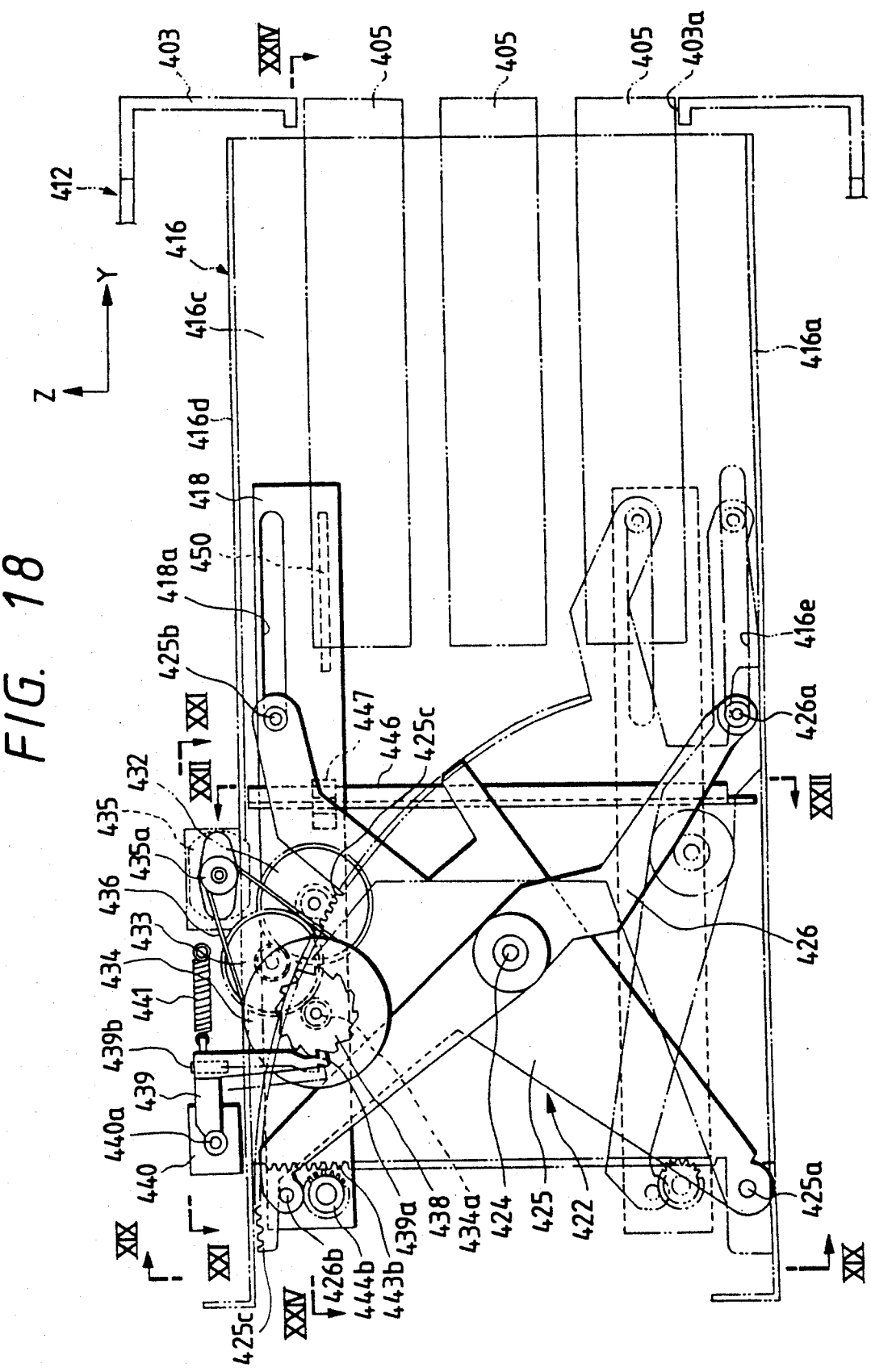
FIGS. 18 to 20 show a right side view, a rear view, and a left side view, respectively, of an internal structure of the magazine type CD player shown in FIG. 16.
Figure 20:
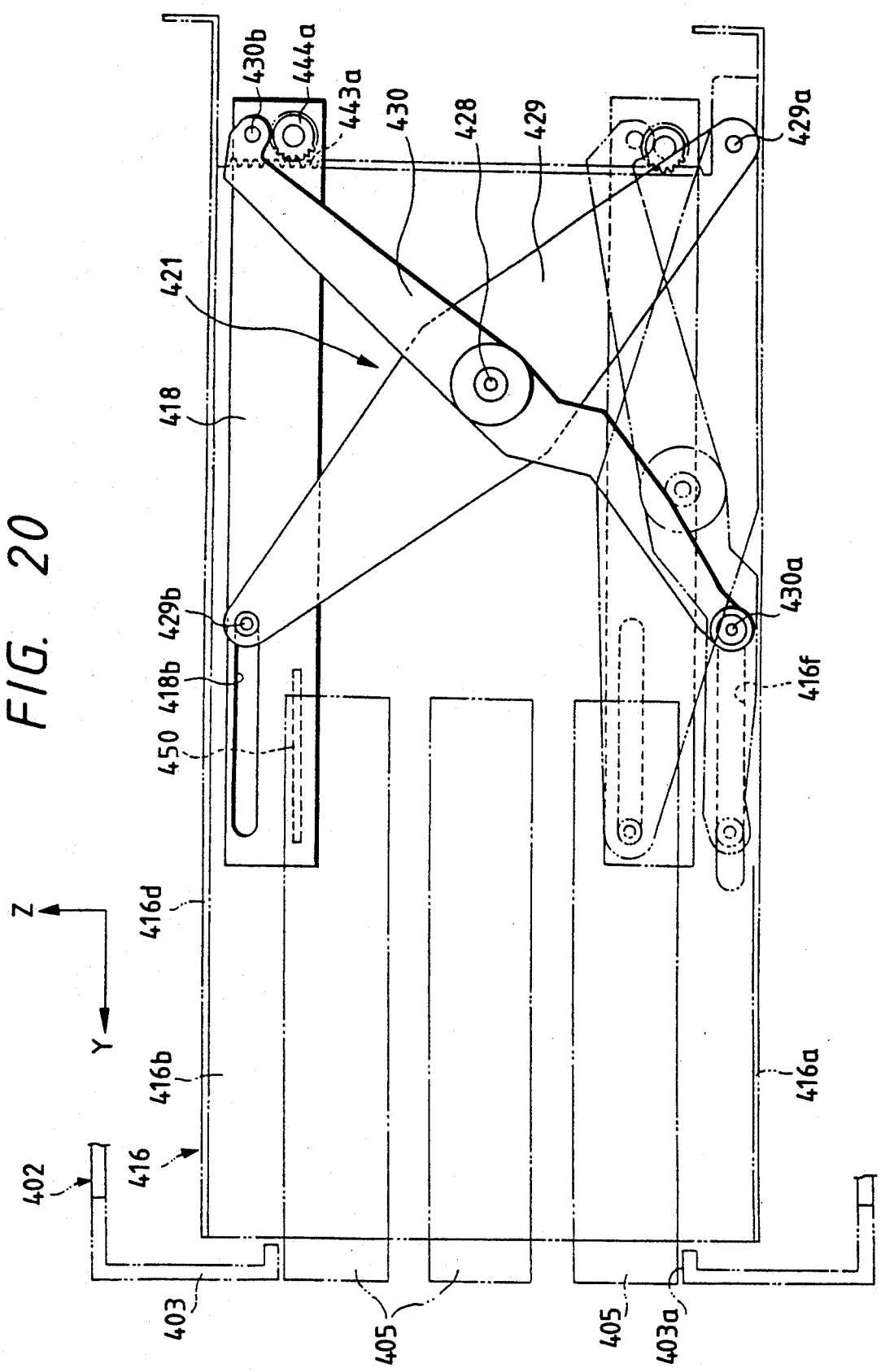

As shown in FIGS. 16, 18 and 20, a parallelopiped chassis 416 is provided within the player housing 402. The chassis 416 includes a rectangular bottom face 416a, rectangular side walls or column portion 416b and 416c upstanding from the longer sides of the bottom face, and a rectangular top face or a frame portion 416 that is disposed in opposition to the bottom face 416a, and bridges the side walls.

Figure 19:
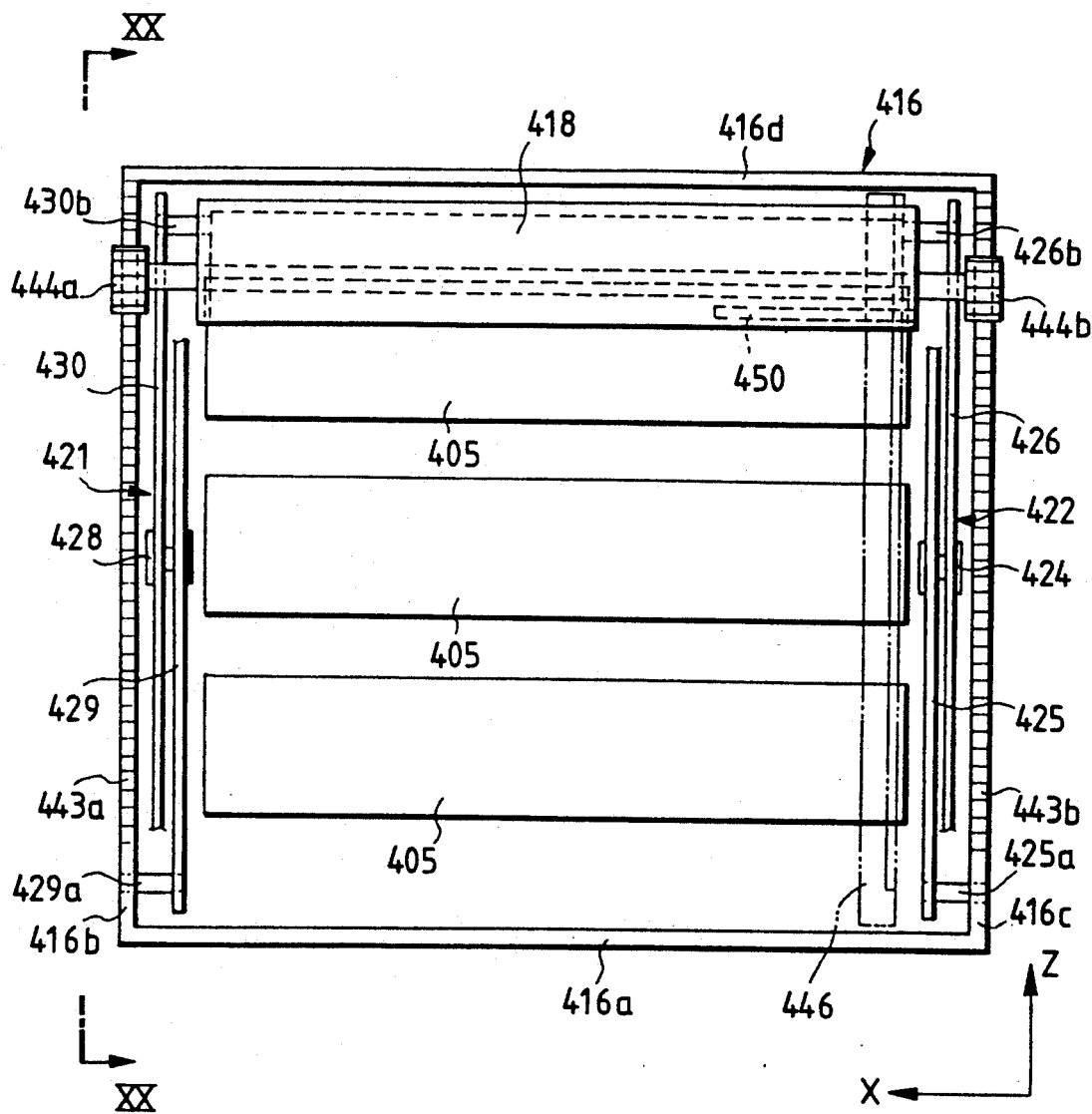

As illustrated in FIG. 18 to 20, between the side walls 416b and 416c of the chassis 416, a support member 418 shaped like a rectangle is disposed facing the bottom face 416a and the frame portion 416d. The following means and mechanism are supported by the support member 418: playing means which includes a turn table and a pick-up and receives and plays the disk 410 from the magazine 405 to the playing means, and after the disk is played, returns the disk to the magazine 405, and a disk clamp mechanism for clamping a disk put on the turn table.

For more details of the playing means and the disk moving means, reference is made to Japanese Patent Unexamined Publication No. 61-261853.

Within the chassis 416, a couple of cross links 421 and 422 are provided sandwiching the support member 418. The support member 418 is movably supported by the paired links 421 and 422 vertically, viz., in the direction in which trays A 411 and trays B 412 are arrayed within each magazine 405.

As shown in FIG. 18, the link 422 supporting the right side of the support member 418 includes a fixed link 425 and a movable link 426, which are pivotally supported by a pin 424. One end (in this instance, the lower end) of the fixed link 425 is pivotally supported by a pin 425a at the lower part of the side wall 416c. The other end or the upper end of the fixed link is provided with a pin 425b, which slidably engages an elongated hole 418a. the hole is formed in the right front portion of the support member 418 while extending along the longitudinal side of the support member. One end or the lower end of the movable link 426 is provided with a pin 426a, which slidably engages an elongated hole 416e. The hole is formed in the lower part of the side wall 416c of the chassis 416, while extending in the longitudinal direction. The other end of the upper end is pivotally coupled with the read end of the right side of the support member 418.

As shown in FIG. 20, the cross line 421 supporting the left side of the support member 418 includes a fixed link 429 and a movable link 420, which are pivotally supported by a pin 428. One end or the upper end of the fixed link 425 is pivotally supported by a pin 429a at the lower part of the side wall 416b of the chassis 416. The other end or the upper end of the fixed link is provided with a pin 429b, which slidably engages an elongated hole 418b. The hole is formed in the front end of the left portion of the support member 418 while extending along the longitudinal side of the support member. One end or the lower end of the movable link 430 is provided with a pin 430a, which slidably engages an elongated hole 416f. The hole is formed in the lower part of the side wall 416c, while extending in the longitudinal direction. The other end or the upper end is pivotally coupled with the front end of the left side of the support member 418.

As shown in FIG. 18, an arcuate sector gear 425c whose curvature center is at the position of a pin 425a as a fulcrum for the fixed link is integrally formed in the portion closer to the swing end portion than to the cross point of the fixed link of the cross link 422 supporting the right portion of the support member 418. The sector gear 425c is in mesh with a small gear portion of a double gear 432 having large and small gears coaxially arranged and integrally formed. The large gear portion of the double gear 432 is in mesh with a small gear portion of another double gear 433. A large gear portion of the double gear 433 engages a gear 434a, which is coaxial and integral with a toothed belt pulley 4 of large diameter. A motor 435 is disposed above the double gear 432. A toothed belt 436 is wound around a toothed belt pulley 435a of small diameter fastened to the output shaft of the motor 435 and the toothed belt pulley 434 of large diameter. The double gears 432 and 433, the toothed belt pulleys 434 and 436, and the motor 435 are supported by a sub-chassis (not shown) mounted to the frame portion 416d of the chassis 416.

The double gears 432 and 433, the toothed belt pulleys 434 and 436, the toothed belt 436, the gear 434a, and the motor 435 make up a link drive means for applying a moment to the cross links 421 and 422. When the motor 435 rotates in the forward or reverse direction, the double gear 432 turns. The turn of the double gear 432 swings the fixed link 425 of the cross link 422, and in turn operates the cross links 421 and 422. Finally, the support member 418 reciprocatively moves in the direction in which the trays are arrayed in the magazine 405. With such a structure that a moment is applied to the swing part of the fixed link 425, a large moment can be applied to the cross links even if the output power of the motor 435 is small. Accordingly, the size of the motor 435 may be reduced.

The cross links 421 and 422, and the link drive means make up positioning means for positioning both the playing means and the support member 418 carrying the playing means in the tray-arrayed direction.

Figure 21:
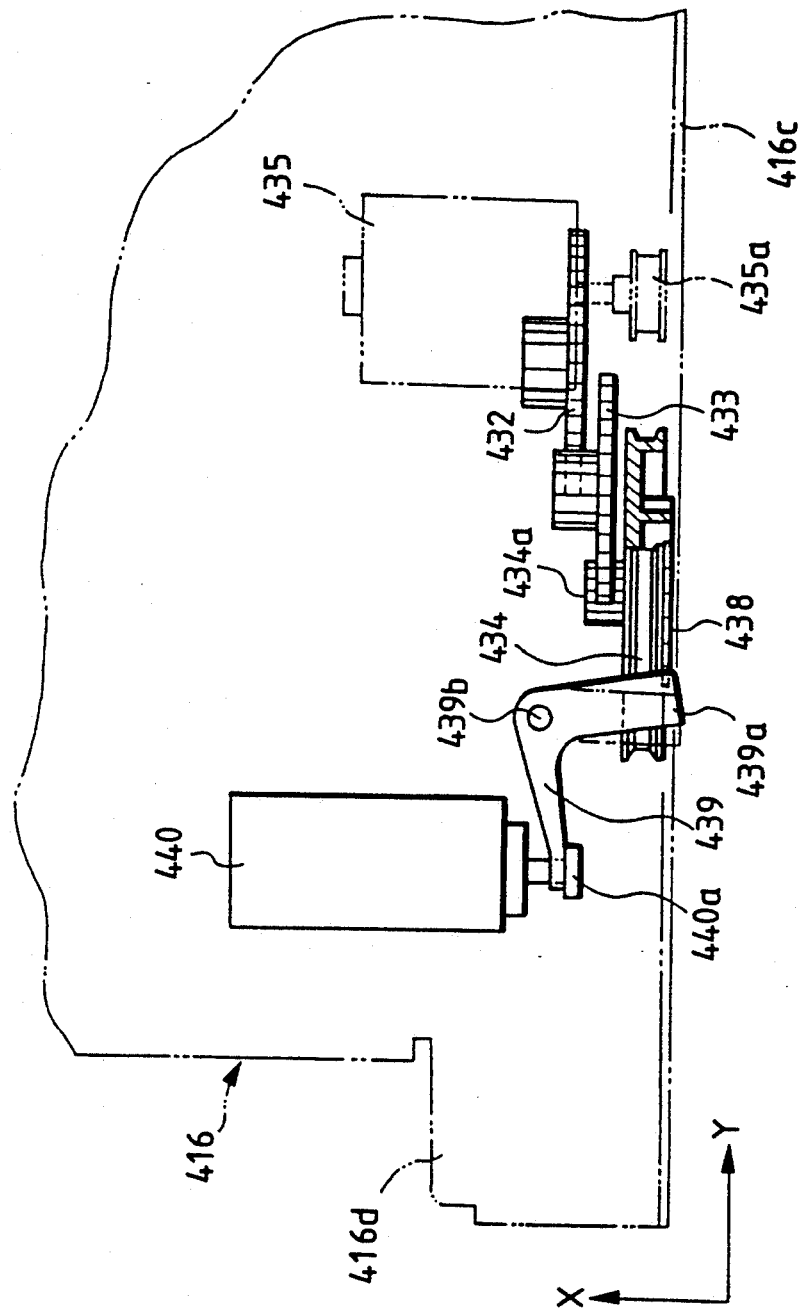
FIG. 21 is a diagram taken on line XXI—XXI in FIG. 18.

As shown in FIGS. 18 and 21, a ratchet pulley 438 is coaxial and integral with the toothed belt pulley 434 as one of the components constituting a power transfer mechanism for transferring a drive power from the motor 435 to the cross links. A select lever 439 has at one end a pawl 439a which engage with the ratchet wheel 438. The select lever is slidably mounted to the substantially central portion of the frame portion 416d of the chassis 416 by means of a pin 439b. The other end of the select 439 is coupled with an output shaft 440a of a solenoid plunger 440. When the plunger 440 is operated to pull the output shaft 440a, the pawl 439a of the select lever 439 is detached from the ratchet wheel 438. The free end of the select lever 439 is coupled with a coil spring 441 for energizing the select lever 439 so that the pawl 439a of the lever 439 engages with the ratchet wheel 438.

The select lever 439 including the ratchet wheel 438 and the paul 439a constitutes a ratchet mechanism. The solenoid plunger 440 and the coiled spring 441 are provided for selectively driving the ratchet mechanism. With such a construction, when the ratchet wheel 438 of the ratchet mechanism engages the pawl 439a, the rotating member, or the toothed belt wheel 434 is stopped at a predetermined angular position. Then, the playing means, which is moved in the tray-arrayed direction, is precisely positioned at the location corresponding to each tray within the magazine 405, by the cross links 421 and 422.

As shown in FIGS. 18 to 20, a pair of synchronizing racks 443a and 443b, arranged parallel to each other, are formed in the rear end portions of both the side walls 416b and 416c of the chassis 416 and along the moving direction of the support member 418 carrying the playing means. A pair of pinions 444a and 444b, which are coaxially formed in the rear end of the support member 418, engage with the racks 443a and 443b. The synchronizing means provides an accurate synchronization of the cross links 421 and 422, and hence remarkably improves the precision of the movement of the playing means in the tray-arrayed direction and the positioning of the playing means at the trays.

As shown in FIGS. 18 and 19, and FIGS. 22 and 23, an address plate 446 with three groups of slits 446a, each group consisting of six slits, then totally eighteen, is disposed in the rear side of the magazine loading portion, and fixed to the chassis 416. A photosensor 447 is mounted on the support member 418 supporting the playing means. The photosensor faces each slit 446a and senses it. A slit sense signal derived from the photo sensor 447 is applied to a counter (not shown) for counting it. A controller (not shown) for controlling the operation of the corresponding CD player is disposed at a given location within the player housing 402. The controller recognizes a stop position of the support member 418 from a count of the counter.

As shown in FIG. 17(b), and FIGS. 18 to 20, and FIG. 24, a tray push member 450 is provided at the right front end of the support member 418 carrying the playing means. The tray push member engages with each tray within the magazine 405, and pushes the tray out of and into the magazine 405. The tray push member 450 is shaped like L as a whole, and is guided in a manner that pins 450a and 450b planted on the tray push member 450 slidably engage into arcuate grooves 418c and 418d formed in the support member 418. The tray push member 450 slidably engages into arcuate grooves 418c and 418d formed in the support member 418. The tray push member 450 is turned about the center of the curvature of each guide groove 418c and 418d (in the direction of arrow R). When the tray push member is turned, the tray 411 or 412 is pushed with the ends 450c and 450d of the push member to insert the tray into or pulled out of the magazine main body 408.

As shown in FIG. 24, a lever member 451 is provided near the tray push member 450 so that it is reciprocatively movable in the right and left directions (in the direction of arrow T). The right end of the lever member engages with the tray push member 450. Although not shown, a drive force applying means for applying drive force to the lever member 451 is provided. The drive force applying means applies a drive force to the lever member 451. The member 451 reciprocates to swing the tray push member 450.

The lever member 451 and the drive force applying means for applying a drive force to the lever member 451 make up tray pushing member drive means to swing the tray push member 450 with respect to the support member 418. The tray pushing member drive means and the tray push member 450 make up the disk moving means which supplies a disk from the magazine 405 to the playing means after the playing means is positioned, and returns it to the magazine after the playing is completed. For more details of the disk moving means, reference is made to Japanese Patent Unexamined Publication No. 61-261853.

As shown in FIG. 19, the try push member 450 for inserting the disk into and pulling it out of the magazine 405 is disposed within cross links 421 and 422 for moving the playing means in the tray-arrayed direction. Accordingly, there is eliminated interference of the tray push member 450 with the cross links 421 and 422, and other mechanisms. The movement of the playing means in the tray-arrayed direction and the drive of the tray push member 450 are smoothly carried out.

An operation of the magazine type CD player thus arranged will be described.

To start, an operator operates an operation board (not shown) on the front panel 403 of the player housing 402, to designate a desired disk. A drive voltage is supplied to the motor 435, and the cross links 421 and 422 start to operate. The support member 418, or the playing means, moves upwardly or downwardly to be positioned at a location corresponding to that disk. The tray push member 450 on the support member 418 is positioned at a location where it engages with the tray carrying the disk. During the movement of the support member 418, the solenoid plunger 440 shown in FIGS. 18 and 21 is kept activated, and the pawl 439a of the ratchet mechanism is being detached from the ratchet wheel 438. No operating noise of the ratchet mechanism is generated during the movement of the support member 418. Upon completion of the positioning of the support member 418, the motor 435 is stopped, and the solenoid plunger 440 is also deactivated. The ratchet wheels 438 and the pawl 439a of the ratchet mechanism are made to engage with each other by the coiled spring 441. The playing means carried on the support member 418 is precisely positioned at a location corresponding to the tray carrying the disk to be played.

Afterwards, the tray push member drive means is operated to swing the tray push member 450 from a location as indicated by a continuous line in FIGS. 17(b) and 24 to a location as indicated by a two-dot chain line in FIG. 24. Accordingly, the tray carrying the disk (e.g., tray 412) is turned by about 90°, as shown in FIG. 17(b), to be ejected from the magazine main body 408. The disk on the tray is set to the playing means, and is clamped on the turn table.

Under this condition, the player is ready for playing the disk. The turn table is turned and the pick-up is operated, to start the playing of the disk.

After the playing ends, the disk is returned to the magazine 405. The disk return operation traces a reverse order of the operating steps for the disk loading operation, and hence no further description of it will be given. Subsequently, the above sequence of operations is repeated in accordance with a piece of music as designated.

Although not shown, the pick-up may be fastened to the side wall of the player housing 402. If so, it may be protected from damage possibly occurring during transportation of the players.

In the disk storage/selected player, a plurality of menu boards each shaped like a polyhedral column is provided. Each side of each menu board presents selectable musical information. One of the plurality of menu boards is turned. The rotation of the one menu board is transferred in synchronism with the remaining menu boards. Accordingly, the polyhedral menu boards are rotated by the same speeds. Accordingly, the player can present more musical information than the conventional player having the similar menu presenting area. In other words, the number of selectable music pieces can be increased without increasing the size of the player.

What is claimed is:

1. A disk storage/select player having means for containing a plurality of disks, and means for playing back a selected item recorded on one of the disks, the player comprising:

a plurality of rotatable menu boards each of which has a polyhedron shape, and each side surface of said menu boards containing information relating to the items recorded on the disks;

drive means for rotating one of said plurality of menu boards;

transfer means, coupled to said drive means, for transferring the rotation of said one menu board to the remaining at least one menu board so that all of said menu boards rotate in synchronism with each other;

a plurality of magazine-type disk players, each of said disk players having a plurality of magazines, each of said magazines containing a plurality of disks, and the plurality of disks contained in each of magazines having items recorded thereon which correspond to the item information contained on said rotatable menu boards;

controller means for enabling that one of said plurality of magazine-type disk players which contains the disk having the selected item recorded thereon; and an input device for inputting information representing the selected item, and wherein said controller means includes:

a converter for converting the information inputted by said input device into numerical data representing a magazine number, a disk number and a disk track number; and a selector for selecting, in accordance with the numerical data, a disk contained in one of said cartridges of one of said disk players for playback of the item recorded at the disk track number.

2. The player as defined in claim 1, wherein each menu board has three side surfaces, and top and bottom triangular surfaces.

3. The player as defined in claim 2, wherein said side surfaces are rectangles.

4. The player as defined in claim 2, wherein each of the side surfaces includes horizontal guide members for supporting a plurality of disk jackets.

5. The player as defined in claim 2, wherein each of said menu boards includes a shaft, and said menu boards are rotatable about their respective shafts.

6. The player as defined in claim 5, wherein said drive means comprises a motor, a first gear means coupled to the shaft of said one menu board, and means for coupling said motor to said first gear means.

7. The player as defined in claim 6, wherein said means for coupling said motor to said first gear means comprises a worm gear.

8. The player as defined in claim 7, wherein said first gear means is a circular gear, said circular gear having three stick-like members disposed at 120° interval from one another along a circumference thereof.

9. The player as defined in claim 8, further comprising photo sensor means for sensing said stick-like members.

10. The player as defined in claim 9, wherein said circular gear is a spur gear, and wherein said player further comprises means for driving said motor so as to rotate said spur gear and said one menu board, said photo sensor means outputting a motor drive inhibit signal to disable said motor drive means upon sensing one of said stick-like members so that said motor drive means can only enable said motor to rotate said spur gear and said one menu board in 120° rotational increments.

11. The player as defined in claim 6, wherein said drive means further comprises first and second pulleys, and a first belt wound around said first and second pulleys, and wherein said motor includes a rotatable shaft, said first pulley being coupled to said motor shaft, and said second pulley being coupled to said means for coupling said motor to said first gear means.

12. The player as defined in claim 8, further comprising input means for inputting a motor drive enable signal, and a controller for receiving said inputted motor drive enable signal and for enabling said motor drive means in response thereto.

13. The player as defined in claim 1, wherein said drive means rotates said one menu board in 120° rotational increments, and wherein said transfer means rotates, said at least one remaining menu boards in 120° rotational increments.

14. The player as defined in claim 1, wherein there are three magazine-type disk players each of which contains three magazines, and wherein each of said three magazines contains six disks.

15. A disk storage/select player having means for containing a plurality of disks, and means for playing back a selected item recorded on one of the disks, the player comprising:
    a plurality of rotatable menu boards each of which has a polyhedron shape, and each side surface of said menu boards containing information relating to the items recorded on the disks;
    drive means for rotating one of said plurality of menu boards;
    transfer means, coupled to said drive means, for transferring the rotation of said one menu board to the remaining at least one menu board so that all of said menu boards rotate in synchronism with each other;
    a plurality of magazine-type disk players, each of said disk players having a plurality of magazines, each of said magazines containing a plurality of disks, and the plurality of disks contained in each of magazines having items recorded thereon which correspond to the item information contained on said rotatable menu boards; and
    controller means for enabling that one of said plurality of magazine-type disk players which contains the disk having the selected item recorded thereon;
    wherein said each of said menu boards includes a shaft, said menu boards being rotatable about their respective shaft, and wherein said transfer means comprises a plurality of pulleys and belts.

16. The player as defined in claim 15, wherein said drive means comprises gear means coupled to the shaft of said one menu board, and motor means for rotating said gear means and wherein the plurality of pulleys of said transfer means are coupled to said gear means through said belts.

17. The player as defined in claim 16, wherein there are at least three menu boards, said one menu board being termed a first menu board, and said remaining menu boards being termed second and third menu boards, respectively.

18. The player as defined in claim 17, wherein said plurality of pulleys of said transfer means comprises a first pulley coupled to the shaft of said second menu board, a second pulley coupled to said gear means, a third pulley coupled to said gear means, and a fourth pulley coupled to the shaft of said third menu board, and wherein said belts comprise a first belt wound around said first and second pulleys, and a second belt wound around said third and fourth pulleys.

* * * * *